United States Patent
Katsuta et al.

(10) Patent No.: US 8,251,165 B2
(45) Date of Patent: Aug. 28, 2012

(54) POWER OUTPUT APPARATUS, HYBRID VEHICLE WITH THE SAME, AND CONTROL METHOD OF POWER OUTPUT APPARATUS

(75) Inventors: Hiroshi Katsuta, Toyota (JP); Hidehiro Oba, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 528 days.

(21) Appl. No.: 12/600,811

(22) PCT Filed: May 16, 2008

(86) PCT No.: PCT/JP2008/058999
§ 371 (c)(1),
(2), (4) Date: Nov. 18, 2009

(87) PCT Pub. No.: WO2008/146617
PCT Pub. Date: Dec. 4, 2008

(65) Prior Publication Data
US 2010/0147610 A1    Jun. 17, 2010

(30) Foreign Application Priority Data

May 25, 2007 (JP) .................................. 2007-138942

(51) Int. Cl.
*B60W 10/04* (2006.01)
(52) U.S. Cl. ................................ 180/65.265; 180/65.21
(58) Field of Classification Search ............... 180/65.21, 180/65.23, 65.24, 65.265, 65.285, 65.28, 180/65.7; 903/915, 917
See application file for complete search history.

(56) References Cited

U.S. PATENT DOCUMENTS

| | | | | | |
|---|---|---|---|---|---|
| 5,577,973 | A | * | 11/1996 | Schmidt | 475/5 |
| 5,730,676 | A | * | 3/1998 | Schmidt | 475/5 |
| 5,935,035 | A | * | 8/1999 | Schmidt | 475/5 |
| 6,461,266 | B1 | * | 10/2002 | Weisz | 475/5 |
| 6,712,734 | B1 | * | 3/2004 | Loeffler | 477/5 |
| 6,953,409 | B2 | * | 10/2005 | Schmidt et al. | 475/5 |
| 7,137,919 | B2 | * | 11/2006 | Holmes | 475/5 |

(Continued)

FOREIGN PATENT DOCUMENTS

DE    198 50 549 A1    5/2000

(Continued)

OTHER PUBLICATIONS

Extended EP Search Report of EP 08764304.5 dated Apr. 19, 2011.

*Primary Examiner* — John Walters
*Assistant Examiner* — Brian Swenson
(74) *Attorney, Agent, or Firm* — Kenyon & Kenyon LLP

(57) ABSTRACT

When a predetermined change speed state shift condition is satisfied while the transmission connects a carrier with a drive shaft, a hybrid vehicle performs a rotational speed adjustment process of conforming a rotational speed of a motor to a target rotational speed based on a gear ratio of the transmission and a rotational speed of the drive shaft, a connection a sun gear with the drive shaft by a gear train of the transmission corresponding to a target speed, a power transfer process of transferring power between the motors in a simultaneous engagement state to make the motors output power required in a post-change speed state corresponding to a target speed, and a disconnection the carrier from the drive shaft.

12 Claims, 17 Drawing Sheets

| U.S. PATENT DOCUMENTS | | | |
|---|---|---|---|
| 7,559,864 B2 * | 7/2009 | Maeda et al. ................... 475/5 |
| 7,572,201 B2 * | 8/2009 | Supina et al. ................... 475/5 |
| 7,762,922 B2 * | 7/2010 | Dreibholz et al. ............... 477/5 |
| 2004/0251862 A1 | 12/2004 | Imai |
| 2005/0072609 A1 | 4/2005 | Eisenhardt |
| 2006/0142104 A1 | 6/2006 | Saller |
| 2008/0015760 A1 * | 1/2008 | Yamauchi ....................... 701/67 |
| 2009/0203495 A1 * | 8/2009 | Muta et al. ..................... 477/3 |
| 2009/0255493 A1 * | 10/2009 | Ichimoto ...................... 123/90.11 |

| FOREIGN PATENT DOCUMENTS | | |
|---|---|---|
| EP | 2 070 789 A1 | 6/2009 |
| JP | 11-227476 A | 8/1999 |
| JP | 2000-108693 A | 4/2000 |
| JP | 2003-106389 A | 4/2003 |
| JP | 2005-125876 A | 5/2005 |
| JP | 2005-155891 A | 6/2005 |
| JP | 2005-170227 A | 6/2005 |
| JP | 2005-297786 A | 10/2005 |

* cited by examiner

POWER OUTPUT APPARATUS, HYBRID VEHICLE WITH THE SAME, AND CONTROL METHOD OF POWER OUTPUT APPARATUS

This is a 371 national phase application of PCT/JP2008/058999 filed 16 May 2008, claiming priority to Japanese Patent Application No. JP 2007-138942 filed 25 May 2007, the contents of which are incorporated herein by reference.

TECHNICAL FIELD

The present invention relates to a power output apparatus that outputs power to a drive shaft, a hybrid vehicle with the same, and a control method of power output apparatus.

BACKGROUND ART

As this type of power output apparatus, there is well-known a conventional power output apparatus including an internal combustion engine, two motors, a so-called Ravigneaux-type planetary gear mechanism, and a parallel-shaft type transmission that can selectively connect two output elements of the planetary gear mechanism with an output member (See Patent Document 1, for example). Also, there is well-known a conventional power output apparatus including a planetary gear mechanism having an input element connected with the internal combustion engine and two output elements respectively connected with a corresponding motor, and a parallel-shaft type transmission having two counter shaft that is connected with the corresponding output elements of the planetary gear mechanism and is linked with a output shaft (See Patent Document 2, for example). In these power output apparatus, the output elements of the planetary gear mechanism can be selectively connected with the output member or the output shaft by the parallel-shaft type transmission. Further, there is well-known a conventional power output apparatus including a power distribution mechanism having an input element connected with an internal combustion engine, a reactive force element connected with a first motor generator, and an output element connected with a second motor generator, and two clutches selectively connecting an axle or an output member with the output element or the reactive force element of the power distribution mechanism (see Patent Document 3, for example).

[Patent Document 1] Japanese Patent Laid-Open No. 2005-155891
[Patent Document 2] Japanese Patent Laid-Open No. 2003-106389
[Patent Document 3] Japanese Patent Laid-Open No. 2005-125876

DISCLOSURE OF THE INVENTION

Each of the above-described power output apparatus allows a selective connection of the output elements of the planetary gear mechanism with the output shaft or the like. However, either of the Patent Documents does not specifically disclose how to change the output element of the planetary gear mechanism connected with the output shaft or the like.

The present invention has a main object to appropriately changing connection states between a drive shaft and first and second elements of a power distribution integration mechanism included in a power output apparatus capable of selectively connecting the first and second elements with the drive shaft and to improve transmission efficiency of power in a wider driving region.

The present invention accomplishes the demand mentioned above by the following configurations applied to a power output apparatus, a hybrid vehicle with the same, and a control method of the power output apparatus.

The power output apparatus according to the present invention is a power output apparatus that outputs power to a drive shaft. The power output apparatus includes an internal combustion engine, a first motor configured to input and output power, a second motor configured to input and output power, an accumulator configured to supply and receive electric power from each of the first and second motors, a power distribution integration mechanism having a first element connected to a rotating shaft of the first motor, a second element connected to a rotating shaft of the second motor, and a third element connected to an engine shaft of the internal combustion engine, the power distribution integration mechanism configured to input or output power based on power input to or output from either two of the three elements to a residual element, a change speed transmission configured to selectively connect either one or both of the first and second elements of the power distribution integration mechanism with the drive shaft and to transmit power from the first element and power from the second element at respective speed ratios to the drive shaft, a power demand setting module configured to set a power demand required for the drive shaft, and a control module that controls the internal combustion engine, the first and second motors and the change speed transmission so as to ensure power equivalent to the set power demand. In response to a satisfaction of a predetermined change speed state shift condition while the change speed transmission connects the one of the first and second elements with the drive shaft, the internal combustion engine is operated and the first and second motors are driven and controlled, the control module disconnects one of the first and second elements of the power distribution integration mechanism from the drive shaft and connects the other of the first and second elements with the drive shaft while performing a rotational speed adjustment process, a connection the other of the first and second elements with the drive shaft by the change speed transmission, a power transfer process, and a disconnection the one of the first and second elements from the drive shaft. The rotational speed adjustment process is a process of adjusting the rotational speed of the first or second motor corresponding to the other of the first and second elements so as to enable the connection between the other of the first and second elements and the drive shaft. The power transfer process is a process of transferring power between the first and second motors while the change speed transmission connects both of the first and second elements with the drive shaft so as to make the first and second motors respectively output power required when only the other of the first and second elements is connected with the drive shaft.

The power output apparatus includes the change speed transmission configured to selectively connect either one or both of the first and second elements of the power distribution integration mechanism with the drive shaft and to transmit power from the first element and power from the second element at respective speed ratios to the drive shaft. When the predetermined change speed state shift condition is satisfied while the change speed transmission connects the one of the first and second elements with the drive shaft, the internal combustion engine is operated and the first and second motors are driven and controlled, the power output apparatus disconnects one of the first and second elements of the power distribution integration mechanism from the drive shaft and connects the other of the first and second elements with the drive shaft. Namely, the power output apparatus ensures power equivalent to the set power demand and connects the other of the first and second elements with the drive shaft by the change speed transmission after the rotational speed adjustment process of adjusting the rotational speed of the first or second motor corresponding to the other of the first and second elements so as to enable the connection between the other of the first and second elements and the drive shaft. Further, the power output apparatus ensures power equivalent to the set power demand and disconnects the one of the first and second elements from the drive shaft by the change speed transmission after the power transfer process of transferring power between the first and second motors while the change speed transmission connects both of the first and second elements with the drive shaft so as to make the first and second motors respectively output power required when only the other of the first and second elements is connected with the drive shaft. That is, both of the first and second elements are once connected with the drive shaft after the rotational speed adjustment process when the change speed transmission connects the one of the first and second elements with the drive shaft. Then, the other of the first and second elements is disconnected from the drive shaft after the power transfer process. Thus, it is possible to appropriately switch the connection between the first element and the drive shaft and the connection between the second element and the drive shaft while reducing shock due to a change of power output to the drive shaft. Accordingly, the power output apparatus appropriately changes connection states between the drive shaft and first and second elements of the power distribution integration mechanism, thereby improving transmission efficiency of power in a wider driving region.

The power transfer process may set start point torques of the first and second motors to motor torque demands of the first and second motors in a pre-change speed state before the change speed transmission connects both of the first and second elements with the drive shaft, the motor torque demands being obtained based on the power demand upon a predetermined timing and an engine torque demand of the internal combustion engine based on the power demand upon the predetermined timing. The power transfer process may set end point torques of the first and second motors to motor torque demands of the first and second motors in a post-change speed state after the change speed transmission disconnects the one of the first and second elements from the drive shaft, the motor torque demands being obtained based on the power demand upon a predetermined timing and an engine torque demand of the internal combustion engine based on the power demand upon the predetermined timing. The power transfer process controls the internal combustion engine, the first and second motors so that the internal combustion engine outputs torque equivalent to the engine torque demand and output torques of the first and second motors changes from the start point torques to the end point torques. Thus, the power transfer process may be appropriate for making the first and second motors respectively output power required when only the other of the first and second elements is connected with the drive shaft.

The control module may set the start and end point torques of the first and second motors based on the power demand and the engine torque demand of the internal combustion engine based on the power demand every time the power demand is set during the power transfer process. The control module may control the internal combustion engine, the first and second motors so that the internal combustion engine outputs torque equivalent to the engine torque demand and output torques of the first and second motors gradually changes from the start point torques to the end point torques. During the power transfer process, the start and end point torques of the first and second motors are set every time the power demand is set and the output torques of the first and second motors are gradually changed from the start point torques to the end point torques. Thus, the power can be transferred between the first and second motors while reducing shock due to a change of torque output to the drive shaft and handling the change of the power demand. Further, setting the start and end point torques every time the power demand is set enables to return to the pre-change speed state while reducing shock due to the change of torque and handling the change of the power demand even if a shift to the post-change speed state is discontinued.

The control module may set the start point torques of the first and second motors to the motor torque demands of the first and second motors based on the power demand set just before the change speed transmission connects both of the first and second elements with the drive shaft and the engine torque demand of the internal combustion engine based on the power demand, upon a start of the power transfer process. The control module may set the end point torques of the first and second motors based on the power demand and the engine torque demand of the internal combustion engine based on the power demand every time the power demand is set during the power transfer process. The control module may control the internal combustion engine, the first and second motors so that the internal combustion engine outputs torque equivalent to the engine torque demand and output torques of the first and second motors gradually changes from the start point torques to the end point torques. Namely, the start point torques are set based on the power demand set just before the change speed transmission connects both of the first and second elements with the drive shaft and the engine torque demand based on the power demand while the end point torques of the first and second motors are set every time the power demand is set. Then, the output torques of the first and second motors are gradually changed from the start point torques to the end point torques. Thus, the power can be transferred between the first and second motors while reducing shock due to the change of torque output to the drive shaft and handling the change of the power demand. Further, it is possible to lighten a computation load in the power transfer process by setting the start point torques only just after the start of the power transfer process.

The control module may set the start point torques of the first and second motors to the motor torque demands of the first and second motors based on the power demand set just before the change speed transmission connects both of the first and second elements with the drive shaft and the engine torque demand of the internal combustion engine based on the power demand, upon a start of the power transfer process. The control module may set the end point torques of the first and second motors based on the set start points torques and speed ratios of the change speed transmission between the first or second element and the drive shaft in the pre-change speed state and the post-change speed state. The control module may control the internal combustion engine, the first and second motors so that the internal combustion engine outputs torque equivalent to the engine torque demand and output torques of the first and second motors gradually changes from the start point torques to the end point torques every time the power demand is set. Namely, both of the start and end point torques are set based on the power demand set just before the change speed transmission connects both of the first and second elements with the drive shaft and the engine torque demand based on the power demand and the output torques of the first and second motors are gradually changed from the start point torques to the end point torques. Thus, the power can be transferred between the first and second motors while lightening the computation load in the power transfer process and reducing shock due to the change of torque output to the drive shaft.

The control module may set the start point torques of the first and second motors to the motor torque demands of the first and second motors based on the power demand set just before the change speed transmission connects both of the first and second elements with the drive shaft and the engine torque demand of the internal combustion engine based on the power demand, during the power transfer process. The control module may set the end point torques of the first and second motors based on the set start points torques and speed ratios of the change speed transmission between the first or second element and the drive shaft in the pre-change speed state and the post-change speed state. The control module may control the internal combustion engine, the first and second motors so that the internal combustion engine outputs torque equivalent to the engine torque demand and the first and second motors respectively output torque equivalent to corresponding one of the end point torques. This may cause shock due to the change of output torques of the first and second motors to some extent. However, it is possible to responsively switch between the connection between the first element and the drive shaft and the connection between the second element and the drive shaft while lightening the computation load in the power transfer process.

The rotational speed adjustment process may conform the rotational speed of the first or second motor corresponding to the other of the first and second elements to a target rotational speed based on a rotational speed of the drive shaft, a speed ratio of the change speed transmission between the first element of the power distribution integration mechanism and the drive shaft, and the speed ratio between the second element and the drive shaft. Thus, the other of the first and second elements that has not connected with the drive shaft can be appropriately connected with the drive shaft while reducing the shock, thereby implementing the connection between the drive shaft and both of the first and second elements of the power distribution integration mechanism.

The change speed transmission may be a parallel-shaft type transmission including a first transmission mechanism having at least one parallel-shaft type gear trains capable of connecting either one of the first and second elements of the power distribution integration mechanism with the drive shaft, and a second transmission mechanism having at least one parallel-shaft type gear trains capable of connecting the other of the first and second elements of the power distribution integration mechanism with the drive shaft.

The change speed transmission may be a planetary gear type transmission including a first planetary gear mechanism capable of connecting the first element of the power distribution integration mechanism with the drive shaft, and a second planetary gear mechanism capable of connecting the second element of the power distribution integration mechanism with the drive shaft.

The change speed transmission may be a planetary gear type transmission including a planetary gear mechanism capable of connecting either one of the first and second elements of the power distribution integration mechanism with the drive shaft, and a coupling mechanism capable of coupling the other of the first and second elements of the power distribution integration mechanism with the drive shaft.

A hybrid vehicle according to the present invention is a hybrid vehicle including the above power output apparatus and drive wheels driven by power from the drive shaft. The power output apparatus appropriately changes connection states between a drive shaft and first and second elements of the power distribution integration mechanism, thereby improving transmission efficiency of power in a wider driving region. Accordingly, in the hybrid vehicle, a fuel consumption and a driving can be improved.

A control method according to the present invention is a control method of a power output apparatus including a drive shaft, an internal combustion engine, first and second motors respectively configured to input and output power, an accumulator configured to supply and receive electric power from each of the first and second motors, a power distribution integration mechanism having a first element connected to a rotating shaft of the first motor, a second element connected to a rotating shaft of the second motor, and a third element connected to an engine shaft of the internal combustion engine, the power distribution integration mechanism configured to input or output power based on power input to or output from either two of the three elements to a residual element, and a change speed transmission configured to selectively connect either one or both of the first and second elements of the power distribution integration mechanism with the drive shaft and to transmit power from the first element and power from the second element at respective speed ratios to the drive shaft. The method includes the steps of (a) adjusting the rotational speed of the first or second motor corresponding to the other of the first and second elements so as to enable the connection between the other of the first and second element and the drive shaft in response to a satisfaction of a predetermined change speed state shift condition while the change speed transmission connects the one of the first and second elements with the drive, shaft, the internal combustion engine is operated and the first and second motors are driven and controlled, (b) connecting the other of the first and second elements with the drive shaft by the change speed transmission, (c) transferring power between the first and second motors while the change speed transmission connects both of the first and second elements with the drive shaft so as to make the first and second motors respectively output power required when only the other of the first and second elements is connected with the drive shaft, and (d) disconnecting the one of the first and second elements from the drive shaft by the change speed transmission.

According to the method, both of the first and second elements are once connected with the drive shaft at Step (b) after the rotational speed adjustment process of Step (a) when the change speed transmission connects the one of the first and second elements with the drive shaft. Then, the other of the first and second elements is disconnected from the drive shaft at Step (d) after the power transfer process of Step (c). Thus, according to the method, it is possible to appropriately switch between the connection between the first element and the drive shaft and the connection between the second element and the drive shaft while reducing shock due to a change of power output to the drive shaft. Accordingly, the power output apparatus appropriately changes connection states between the drive shaft and first and second elements of the power distribution integration mechanism, thereby improving transmission efficiency of power in a wider driving region. Further, in the method, torque commands of the internal combustion engine, the first and second motors may be set so as to ensure power equivalent to the power demand required for the drive shaft while Steps (a)-(b) are performed.

BRIEF DESCRIPTION OF THE DRAWINGS

FIG. 21 is a schematic block diagram of another transmission 100 applicable to the hybrid vehicle 20 and the like;

FIG. 22 is a schematic block diagram of still another transmission 200 applicable to the hybrid vehicle 20 and the like.

BEST MODE FOR CARRYING OUT THE INVENTION

Next, a best mode for carrying out the present invention will be described using an embodiment.

Figure 1:
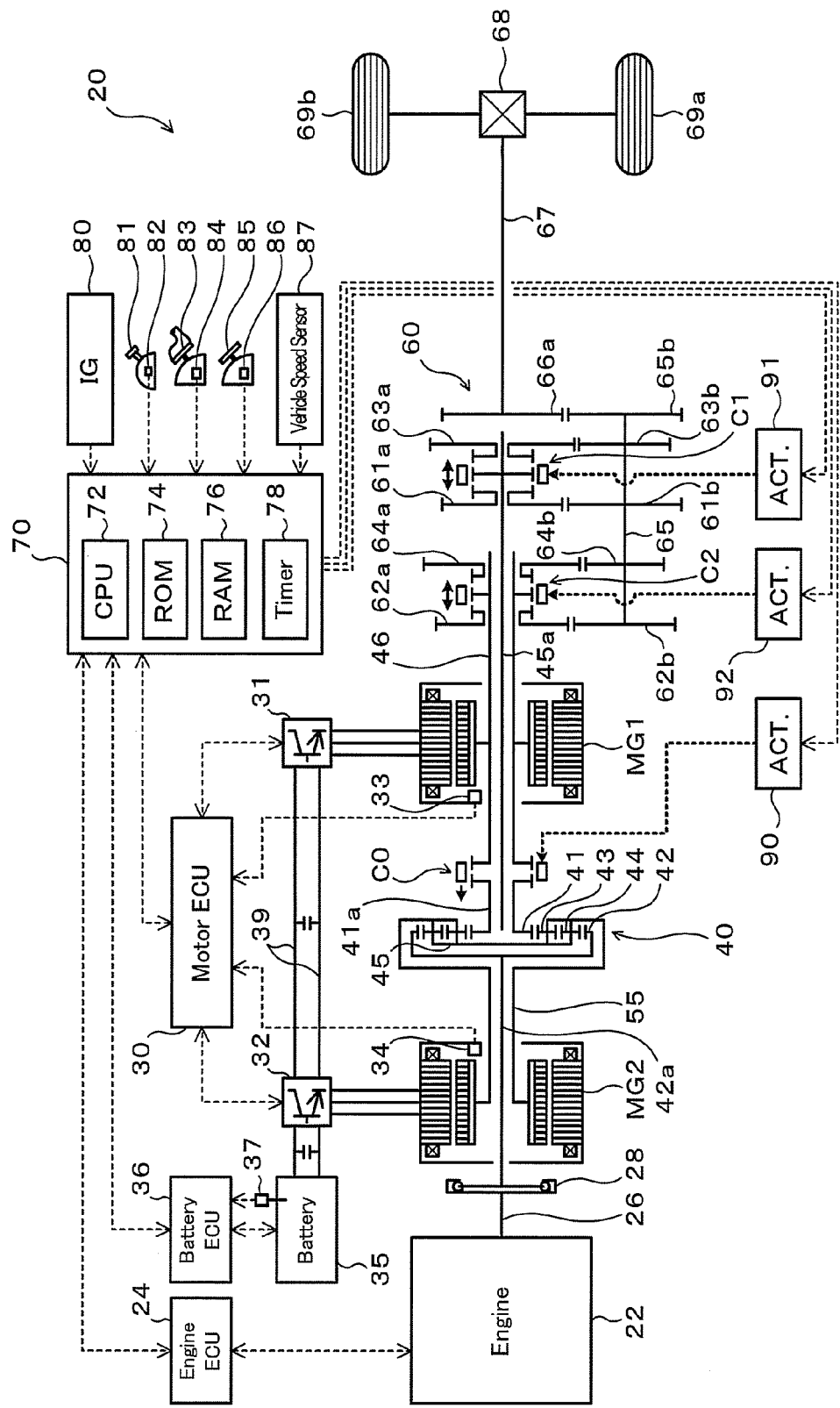
FIG. 1 is a schematic block diagram of a hybrid vehicle 20 according to one embodiment of the present invention.

FIG. 1 is a schematic block diagram of a hybrid vehicle 20 according to one embodiment of the invention. The hybrid vehicle 20 shown in FIG. 1 is constructed as a rear-wheel drive vehicle and includes an engine 22 located in a front portion of the vehicle body, a power distribution integration mechanism 40 connected to a crankshaft (engine shaft) 26 of the engine 22, a motor MG1 having power generation capability and linked with the power distribution integration mechanism 40, a motor MG2 having power generation capability and linked with the power distribution integration mechanism 40 to be coaxial with the motor MG1, a transmission 60 that transmits power from the power distribution integration mechanism 40 to a drive shaft 67 while changing a rotational speed, and a hybrid electronic control unit (hereafter referred to as "hybrid ECU") 70 configured to control operations of the whole hybrid vehicle 20.

The engine 22 is an internal combustion engine that receives a supply of a hydrocarbon fuel, such as gasoline or light oil, and outputs power. The engine 22 is under control of an engine electronic control unit (hereafter referred to as "engine ECU") 24 and is subjected to, for example, a fuel injection control, an ignition control, and an intake air control. The engine ECU 24 inputs diverse signals from various sensors that are provided for the engine 22 to measure and detect operating states of the engine 22, for example, a crank position sensor (not shown) mounted on the crankshaft 26. The engine ECU 24 establishes communication with the hybrid ECU 70 to drive and control the engine 22 in response to control signals from the hybrid ECU 70 and with reference to the diverse signals from the various sensors and to output data regarding the operating states of the engine 22 to the hybrid ECU 70 according to the requirements.

The motors MG1 and MG2 are constructed as synchronous motor generators of an identical specification that can be operated both as a generator and as a motor. The motors MG1 and MG2 receive and supply electric power to a battery 35 or a secondary cell via inverters 31 and 32. Power lines 39 connecting the battery 35 with the inverters 31 and 32 are structured as a common positive bus and a negative bus shared by the inverters 31 and 32. Such connection enables electric power generated by one of the motors MG1 and MG2 to be consumed by the other motor MG2 or MG1. The battery 35 may thus be charged with surplus electric power generated by either of the motors MG1 and MG2, while being discharged to supplement insufficient electric power. The battery 35 is neither charged nor discharged upon the balance of the input and output of electric powers between the motors MG1 and MG2. Both the motors MG1 and MG2 are driven and controlled by a motor electronic control unit (hereafter referred to as "motor ECU") 30. The motor ECU 30 inputs various signals required for driving and controlling the motors MG1 and MG2, for example, signals representing rotational positions of rotors in the motors MG1 and MG2 from rotational position detection sensors 33 and 34 and signals representing phase currents to be applied to the motors MG1 and MG2 from current sensors (not shown). The motor ECU 30 outputs switching control signals to the inverters 31 and 32. The motor ECU 30 executes a rotational speed computation routine (not shown) to compute rotational speeds Nm1 and Nm2 of the rotors of the motors MG1 and MG2 from the signals output from the rotational position detection sensors 33 and 34. The motor ECU 30 establishes communication with the hybrid ECU 70 to drive and control the motors MG1 and MG2 in response to control signals received from the hybrid ECU 70 and to output data regarding operating states of the motors MG1 and MG2 to the hybrid ECU 70 according to the requirements.

The battery 35 is under control and management of a battery electronic control unit (hereafter referred to as "battery ECU") 36. The battery ECU 36 inputs various signals required for management and control of the battery 35, for example, an inter-terminal voltage from a voltage sensor (not shown) located between terminals of the battery 35, a charge-discharge current from a current sensor (not shown) located in the power line 39 connecting with an output terminal of the battery 35, and a battery temperature Tb from a temperature sensor 37 attached to the battery 35. The battery ECU 36 outputs data regarding operating states of the battery 35 by communication to the hybrid ECU 70 and to the engine ECU 24 according to the requirements. In the embodiment, the battery ECU 36 calculates a remaining charge amount or a state of charge SOC of the battery 35 based on an integrating value the charge-discharge current measured by the current sensor and calculates a charge-discharge power demand Pb* of the battery 35 based on the computed state of charge SOC. The battery ECU 36 also sets an input limit Win as an allowable charging power to be charged into the battery 35 and an output limit Wout as an allowable discharging power to be discharged from the battery 35, based on the computed state of charge SOC and the measured battery temperature Tb. The input and output limits Win and Wout of the battery 35 are set by setting base values depending on the battery temperature Tb and setting an input limit correction coefficient and an output limit correction coefficient based on the state of charge SOC of the battery 35, and then multiplying the set base value of the input and output limits Win and Wout by, the set correction coefficient.

The power distribution integration mechanism 40 is housed within a non-illustrated transmission case (casing) together with the motors MG1 and MG2 and the transmission 60 and is arranged apart from the engine 22 by a predetermined distance to be coaxial with the crankshaft 26. The power distribution integration mechanism 40 of the embodiment is a double pinion planetary gear mechanism and includes a sun gear 41 that is an external gear, a ring gear 42 that is an internal gear arranged concentrically with the sun gear 41, and a carrier 45 that supports at least one set of two pinion gears 43 and 44 intermeshing with each other so as to allow both their revolutions and their rotations on their axes. One of the two pinion gears 43 and 44 engages with the sun gear 41 and the other engages with the ring gear 42. In the power distribution integration mechanism 40, the sun gear 41 (second element), the ring gear 42 (third element), and the carrier 45 (first element) are designed as elements of differential rotations. In the embodiment, the power distribution integration mechanism 40 is configured to have a gear ratio ρ (quotient of the number of teeth of the sun gear 41 divided by the number of teeth of the ring gear 42) satisfying an equation of ρ=0.5. Since the sun gear 41 and the carrier 45 have equal torque distribution fractions from the engine 22, the motors MG1 and MG2 are enabled to have identical specifications without using a reduction gear mechanism or any equivalent mechanism. Thus, it is possible to desirably downsize the power output apparatus, to improve productivity of the power output apparatus, and to reduce manufacturing cost of the power output apparatus. The gear ratio ρ of the power distribution integration mechanism 40 may otherwise be selected in a range of, for example, 0.4 to 0.6. The sun gear 41 or the second element of the power distribution integration mechanism 40 is connected with the motor MG1 (more specifically with its hollow rotor) or a second motor via a hollow sun gear shaft 41a extended from the sun gear 41 in a direction opposite to the engine 22 (that is, toward a rear portion of the vehicle body) and a hollow first motor shaft 46. The carrier 45 or the first element is connected with the motor MG2 (more specifically with its hollow rotor) or a first motor via a hollow second motor shaft 55 extended toward the engine 22. The ring gear 42 or the third element is connected with the crankshaft 26 of the engine 22 via a ring gear shaft 42a extended to pass through the second motor shaft 55 and the motor MG2, as well as a damper 28.

As shown in FIG. 1, a clutch C0 (connecting-disconnecting device) is disposed between the sun gear shaft 41a and the first motor shaft 46' to allow a connection (drive source-element connection) between the sun gear shaft 41a and the first motor shaft 46 and a release of the connection. In the embodiment, for example, the clutch C0 is constructed as a dog clutch including a movable engagement member that is capable of engaging with both an engagement portion secured to the sun gear shaft 41a and an engagement portion secured to the first motor shaft 46 and is moved back and forth in an axial direction of the sun gear shaft 41a and the first motor shaft 46 by an electromagnetic, electric, or hydraulic actuator 90. When the connection between the sun gear shaft 41a and the first motor shaft 46 is released by the clutch C0, connection between the motor MG1 or the second motor and the sun gear 41 or the second element of the power distribution integration mechanism 40, so that the engine 22 can be substantially separated from the motors MG1 and MG2 and the transmission 60 by the function of the power distribution integration mechanism 40. The first motor shaft 46 that can be connected with the sun gear 41 of the power distribution integration mechanism 40 via the clutch C0 is further extended from the motor MG1 in the direction opposite to the engine 22 (toward the rear portion of the vehicle body) and is connected with the transmission 60. A carrier shaft (connecting shaft) 45a is extended from the carrier 45 of the power distribution integration mechanism 40 in the direction opposite to the engine 22 (toward the rear portion of the vehicle body). The carrier shaft 45a passes through the hollow sun gear shaft 41a and the hollow first motor shaft 46, and is connected with the transmission 60. Thus, in the embodiment, the power distribution integration mechanism 40 is arranged coaxially with the motors MG1 and MG2 and is located between the motors MG1 and MG2 coaxially arranged with each other. Further, the engine 22 is arranged coaxially with the motor MG2 and is located to oppose the transmission 60 across the power distribution integration mechanism 40. The engine 22, the motor MG2, the power distribution integration mechanism 40, the motor MG1, and the transmission 60 as constituents of the power output apparatus are thus arranged in this sequence from the forward to the rearward of the vehicle body. This arrangement reduces the size of the power output apparatus to be suitable for mounting on the rear-wheel drive hybrid vehicle 20.

The transmission 60 is configured as a parallel-shaft type automatic transmission, capable of setting a change speed state (speed ratio) in a plurality of stages and includes a first counter drive gear 61a and a first counter driven gear 61b constituting a first gear train, a second counter drive gear 62a and a second counter driven gear 62b constituting a second gear train, a third counter drive gear 63a and a third counter driven gear 63b constituting a third gear train, a fourth counter drive gear 64a and a fourth counter driven gear 64b constituting a fourth gear train, a counter shaft 65 to which each of the counter driven gears 61b to 64b and a gear 65b are fixed, clutches C1 and C2, a gear 66a attached to the drive shaft 67, a reverse gear train (not shown) and the like (hereafter the "counter drive gear" and the "counter driven gear" are simply referred to as a "gear" as appropriate). In the transmission 60, a gear ratio or the speed ratio G(1) of the first gear train is the largest, and the gear ratio G(n) is reduced as going through the second gear train, the third gear train and the fourth gear train.

As shown in FIG. 1, the first gear 61a of the first gear train is held by the carrier shaft 45a extended from the carrier 45 or the first element of the power distribution integration mechanism 40 rotatably and immovably in the axial direction and always engages with the first gear 61b fixed to the counter shaft 65. Similarly, the third gear 63a of the third gear train is held by the carrier shaft 45a rotatably and immovably in the axial direction and always engages with the third gear 63b fixed to the counter shaft 65. In the embodiment, the clutch C1 is arranged on the carrier shaft 45a side (counter drive gear side). The clutch C1 can selectively fix either one of the first gear 61a (first gear train) and the third gear 63a (third gear train) to the carrier shaft 45a and rotatably release both the first gear 61a and the third gear 63a with respect to the carrier shaft 45a. In the embodiment, for example, the clutch C1 is constructed as a dog clutch that is moved back and forth in an axial direction of the sun gear shaft 41a and the like by an electromagnetic, electric, or hydraulic actuator 91 so as to connect an engagement portion secured to the carrier shaft 45a with either one of an engagement portion secured to the first gear 61a and the an engagement portion secured to the third gear 63a. The gears 61a, 61b of the first gear train, the gears 63a, 63b of the third gear train, and the clutch C1 constitute a first transmission mechanism of the transmission 60. The second gear 62a of the second gear train is held rotatably and immovably in the axial direction by the first motor shaft 46 that can be connected with the sun gear 41 or the second element of the power distribution integration mechanism 40 through the clutch C0 and always engages with the second gear 62b secured to the counter shaft 65. Similarly, the fourth gear 64a of the fourth gear train is also held rotatably and immovably in the axial direction by the first motor shaft 46 and always engages with the fourth gear 64b secured to the counter shaft 65. In the embodiment, the clutch C2 is arranged on the first motor shaft 46 side (counter drive gear side). The clutch C2 can selectively fix either one of the second gear 62a (second gear train) and the fourth gear 64a (fourth gear train) to the first motor shaft 46 and rotatably release both the second gear 62a and the fourth gear 64a with respect to the first motor shaft 46. In the embodiment, the clutch C2 is also constructed as a dog clutch that is moved back and forth in an axial direction of the sun gear shaft 41a and the like by an electromagnetic, electric, or hydraulic actuator 92 so as to connect an engagement portion secured to the first motor shaft 46 with either one of an engagement portion secured to the second gear 62a and the an engagement portion secured to the fourth gear 64a. The gears 62a, 62b of the second gear train, the gears 64a, 64b of the fourth gear train, and the clutch C2 constitute a second transmission mechanism of the transmission 60.

The power transmitted from the carrier shaft 45a or the first motor shaft 46 to the counter shaft 65 is transmitted to the drive shaft 67 through the gears 65b, 66b (in the embodiment, a gear ratio between the gears 65b and 66b is "1:1") and is output to rear wheels 69a, 69b or drive wheels in the end through a differential gear 68. By arranging the clutches C1, C2 on the side of the carrier shaft 45a and the first motor shaft 46 as in the transmission 60 of the embodiment, losses can be reduced by the clutches C1, C2 when the gears 61a to 64a are fixed to the carrier shaft 45a or the first motor shaft 46. That though depending on a ratio of the numbers of teeth in the respective gear trains, the rotational speed of the gear 64a idling before being fixed to the first motor shaft 46 by the clutch C2 is lower than the rotational speed of the gear 64b on the corresponding counter shaft 65 side with regard to the second transmission mechanism including the fourth gear train with a smaller reduction ratio. Thus, the dog of the gear 64a and the dog of the first motor shaft 46 can be engaged with each other with a smaller loss by disposing at least the clutch C2 on the first motor shaft 46 side. With regard to the first transmission mechanism including the first gear train with a large reduction ratio, the clutch C1 may be provided on the counter shaft 65 side.

According to the transmission 60 configured as described above, the power from the carrier shaft 45a can be transmitted to the drive shaft 67 through the first gear 61a (first gear train) or the third gear 63a (third gear train) and the counter shaft 65 by disengaging the clutch C2 and fixing either one of the first gear 61a (first gear train) and the third gear 63a (third gear train) to the carrier shaft 45a by the clutch C1. Further, the power from the first motor shaft 46 can be transmitted to the drive shaft 67 through the second gear 62a (second gear train) or the fourth gear 64a (fourth gear train) and the counter shaft 65 by engaging the clutch C0 and disengaging the clutch C1 and by fixing either one of the second gear 62a (second gear train) and the fourth gear 64a (fourth gear train) to the first motor shaft 46 by the clutch C2. Hereafter, the state to transmit the power through the first gear train is referred to as the "first change speed state (first speed)", the state to transmit the power through the second gear train as the "second change speed state (second speed)", the state to transmit the power through the third gear train as the "third change speed state (third speed)", and the state to transmit the power through the fourth gear train as the "fourth change speed state (fourth speed)".

The hybrid ECU 70 is constructed as a microprocessor including a CPU 72, a ROM 74 that stores processing programs, a RAM 76 that temporarily stores data, a timer 78 configured to perform a time measurement process in response to a time measurement command, a non-illustrated input-output port, and a non-illustrated communication port. The hybrid ECU 70 receives various inputs via the input port: an ignition signal from an ignition switch (start switch) 80, a shift position SP from a shift position sensor 82 that detects the current position of a shift lever 81, an accelerator opening Acc from an accelerator pedal position sensor 84 that measures a depression amount of an accelerator pedal 83, a brake pedal position BP from a brake pedal position sensor 86 that measures a depression amount of a brake pedal 85, and a vehicle speed V from a vehicle speed sensor 87. The hybrid ECU 70 communicates with the engine ECU 24, the motor ECU 30, and the battery ECU 36 via the communication port to transmit diverse control signals and data to and from the engine ECU 24, the motor ECU 30, and the battery ECU 36, as mentioned previously. The hybrid ECU 70 also controls the clutch C0, the actuators 90-92 of the clutch C1, C2 includes in the transmission 60.

Operations of the hybrid vehicle 20 are described below with reference to FIGS. 2 through 11. In FIGS. 2 through 8, an S-axis represents a rotational speed of the sun gear 41 in the power distribution integration mechanism 40 (equivalent to a rotational speed Nm1 of the motor MG1 or the first motor shaft 46). An R-axis represents a rotational speed of the ring gear 42 in the power distribution integration mechanism 40 (equivalent to a rotational speed Ne of the engine 22). A C-axis represents a rotational speed of the carrier 45 in the power distribution integration mechanism 40 (equivalent to a rotational speed of the carrier shaft 45a and the ring gear 52 of the reduction gear mechanism 50). A 61a-axis to 64a-axis, 65-axis and 67-axis respectively represent rotational speeds of the first gear 61a to fourth gear 64a, the counter shaft 65 and the drive shaft 67.

Figure 2:
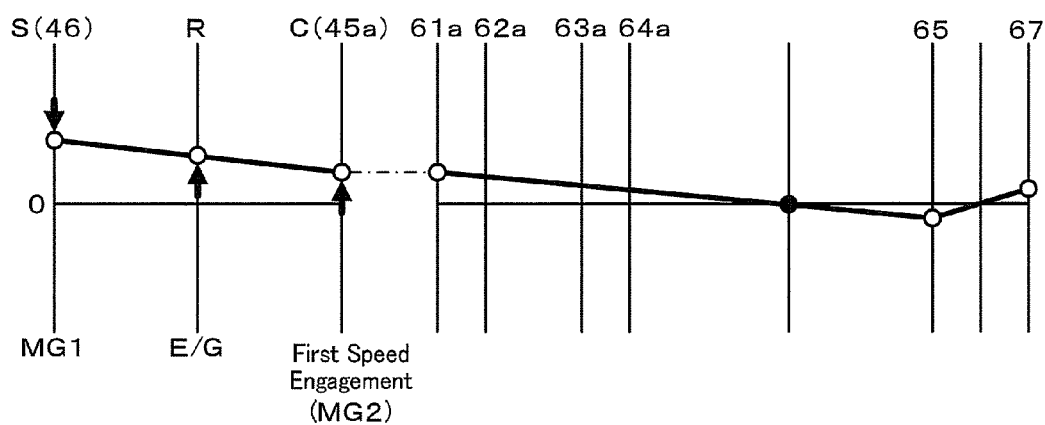
FIG. 2 is an explanatory view exemplifying a state of torques and rotational speeds of primary elements included in a power distribution integration mechanism 40 and the transmission 60 when a change speed state of the transmission 60 is changed during a drive of the hybrid vehicle 20 with an engagement of a clutch C0 and an operation of an engine 22.
Figure 3:
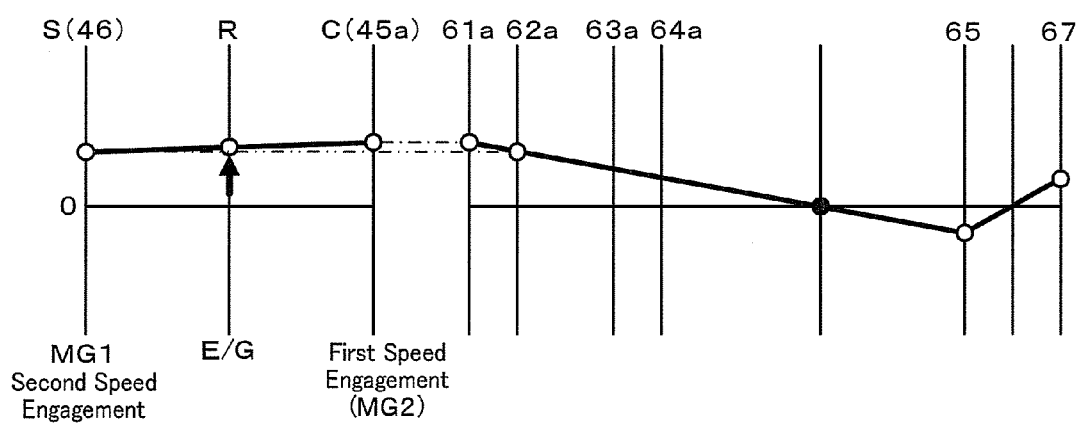
FIG. 3 is a similar explanatory view to FIG. 2.
Figure 4:
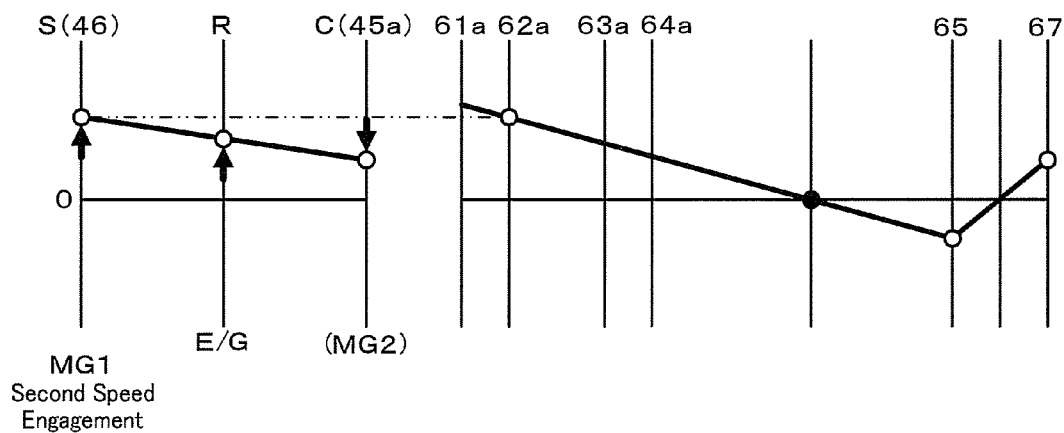
FIG. 4 is a similar explanatory view to FIG. 2.

When the clutch C2 is disengaged and the first gear 61a (first gear train) is fixed to the carrier shaft 45a by the clutch C1 during a drive of the hybrid vehicle 20 with an engagement of the clutch C0 and an operation of the engine 22, as shown in FIG. 2, the power from the carrier shaft 45a can be speed-changed (reduced) in accordance with the speed ratio of the first gear train (first gears 61a, 61b) and outputted to the drive shaft 67. Also, as shown in FIG. 3, the second gear 62a (second gear train) can be fixed to the first motor shaft 46 by the clutch C2 while the clutch C1 fixes the first gear 61a (first gear train) to the carrier shaft 45a by rotationally synchronizing the first motor shaft 46 (sun gear 41) and the second gear 62a that always engages with the second gear 62b secured to the counter shaft 65 according to a change in the vehicle speed V (rotational speed of the drive shaft 67) in the first change speed state. Hereafter, such a state to connect the carrier 45 or the first element of the power distribution integration mechanism 40 with the drive shaft 67 by the first gear train of the transmission 60 and to connect the sun gear 41 or the second element with the drive shaft 67 by the second gear train of the transmission 60 (FIG. 3) is "$1^{st}$ speed-$2^{nd}$ speed simultaneous engagement state" or "first simultaneous engagement state". When torque commands of the motors MG1 and MG2 is set to a value 0 in the $1^{st}$ speed-$2^{nd}$ speed simultaneous engagement state, the power (torque) from the engine 22 can be mechanically (directly) transmitted to the drive shaft 67 at a first fixed speed ratio $\gamma 1$ that is a value between the speed ratio G(1) of the first gear train and the speed ratio G(2) of the second gear train $(=(1-\rho) \cdot G(1)+\rho G(2))$ without conversion to electric energy. The rotational speeds of the sun gear 41 (motor MG1), the ring gear 42 (engine 22) and the carrier 45 (motor MG2) in the $1^{st}$ speed-$2^{nd}$ speed simultaneous engagement state depends on the speed ratio G(1) and G(2) of the transmission 60 and the gear ratio $\rho$ of the power distribution integration mechanism 40 at each vehicle speed. When the clutch C1 is disengaged in the $1^{st}$ speed-$2^{nd}$ speed simultaneous engagement state shown in FIG. 3, as shown by a two-dot chain line in FIG. 4, only the second gear 62a (second gear train) is fixed to the first motor shaft 46 (sun gear 41) by the clutch C2, and the power from the first motor shaft 46 can be speed-changed in accordance with the speed ratio G(2) of the second gear train (second gears 62a, 62b) and outputted to the drive shaft 67.

Figure 5:
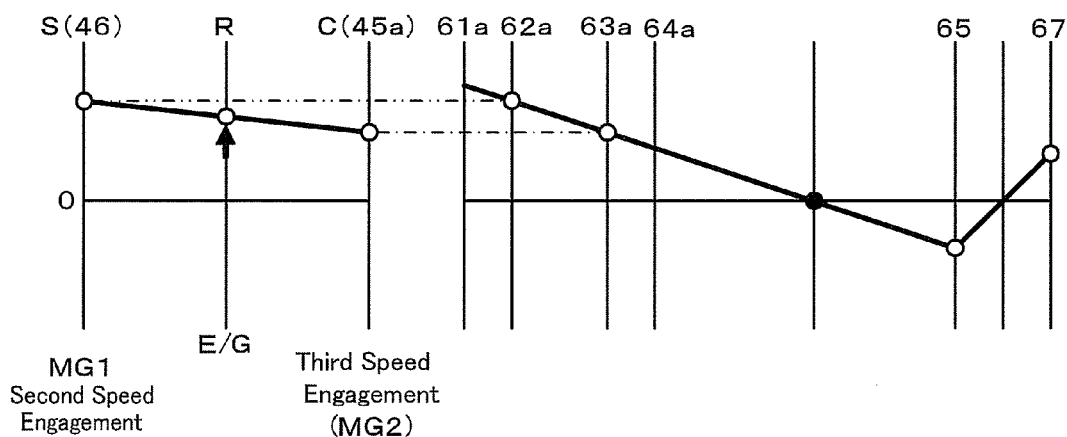
FIG. 5 is a similar explanatory view to FIG. 2.
Figure 6:
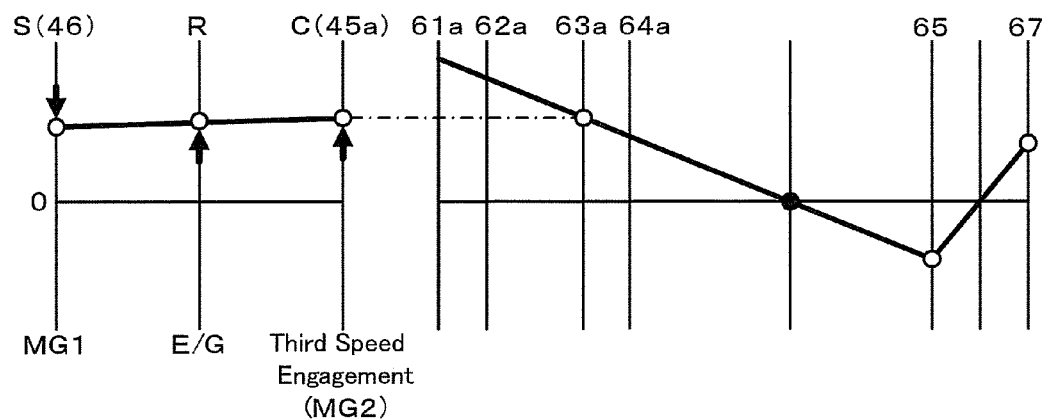
FIG. 6 is a similar explanatory view to FIG. 2.

Similarly, as shown in FIG. 5, the third gear 63a (third gear train) can be fixed to the carrier shaft 45a by the clutch C1 while the clutch C2 fixes the second gear 62a (second gear train) to the first motor shaft 46 by rotationally synchronizing the carrier shaft 45a (carrier 45) and the third gear 63a that always engages with the third gear 63b secured to the counter shaft 65 according to a change, in the vehicle speed V in the second change speed state. Hereafter, such a state to connect the sun gear 41 or the second element of the power distribution integration mechanism 40 with the drive shaft 67 by the second gear train of the transmission 60 and to connect the carrier 45 or the first element with the drive shaft 67 by the third gear train of the transmission 60 (FIG. 5) is referred to as a "$2^{nd}$ speed-$3^{rd}$ speed simultaneous engagement state" or "second simultaneous engagement state". When torque commands of the motors MG1 and MG2 is set to a value 0 in the $2^{nd}$ speed-$3^{rd}$ speed simultaneous engagement state, the power (torque) from the engine 22 can be mechanically (directly) transmitted to the drive shaft 67 at a second fixed speed ratio $\gamma 2$ that is a value between the speed ratio G(2) of the second gear train and the third ratio G(3) of the third gear train $(=\rho \cdot G(2)+(1-\rho) \cdot G(3))$ without conversion to electric energy. The rotational speeds of the sun gear 41 (motor MG1), the ring gear 42 (engine 22) and the carrier 45 (motor MG2) in the $2^{nd}$ speed-$3^{rd}$ speed simultaneous engagement state depends on the speed ratio G(2) and G(3) of the transmission 60 and the gear ratio $\rho$ of the power distribution integration mechanism 40 at each vehicle speed. When the clutch C2 is disengaged in the $2^{nd}$ speed-$3^{rd}$ speed simultaneous engagement state shown in FIG. 5, as shown by a two-dot chain line in FIG. 6, only the third gear 63a (third gear train) is fixed to the carrier shaft 45a (carrier 45) by the clutch C1, and the power from the carrier shaft 45a can be speed-changed in accordance with the speed ratio G(3) of the third gear train (third gears 63a, 63b) and outputted to the drive shaft 67.

Figure 7:
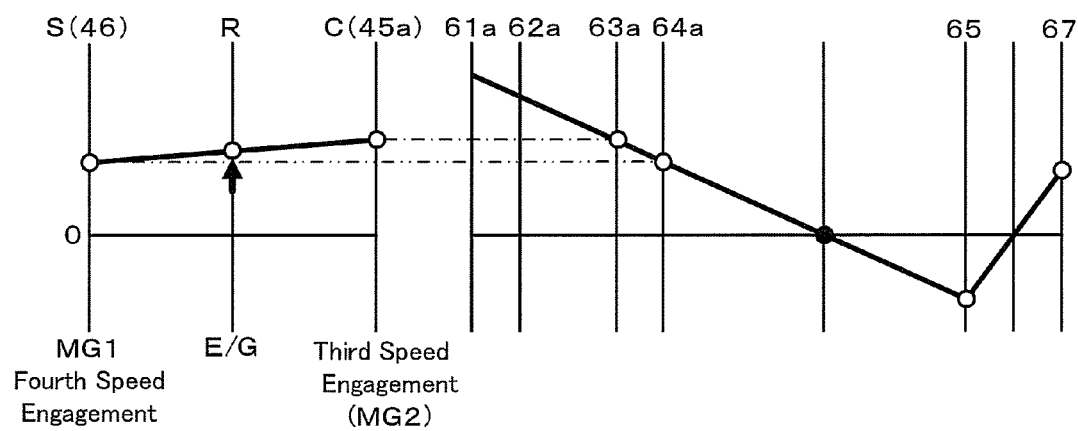
FIG. 7 is a similar explanatory view to FIG. 2.
Figure 8:
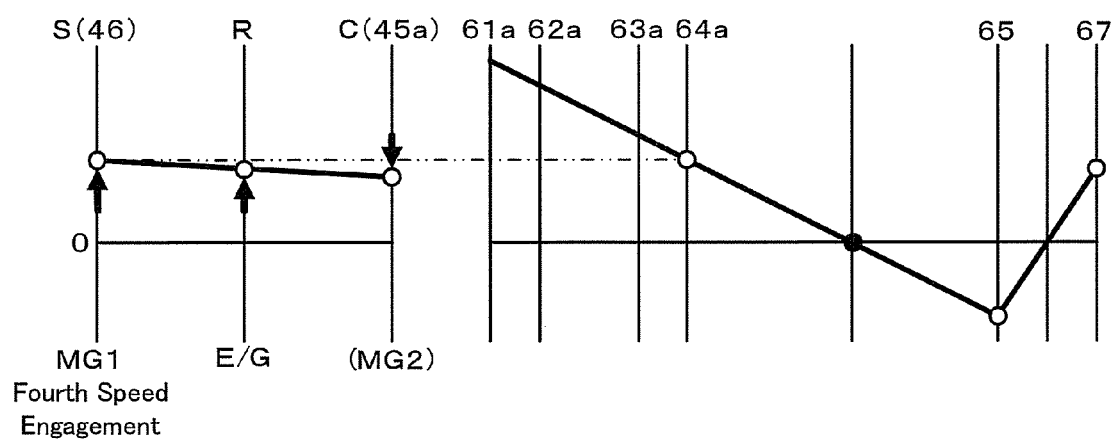
FIG. 8 is a similar explanatory view to FIG. 2.

Further, as shown in FIG. 7, the fourth gear 64a (fourth gear train) can be fixed to the first motor shaft 46 by the clutch C2 while the clutch C1 fixes the third gear 63a (third gear train) to the carrier shaft 45a by rotationally synchronizing the first motor shaft 46 (sun gear 41) and the fourth gear 64a that always engages with the fourth gear 64b secured to the counter shaft 65 according to a change in the vehicle speed V in the third change speed state. Hereafter, such a state to connect the carrier 45 or the first element of the power distribution integration mechanism 40 with the drive shaft 67 by the third gear train of the transmission 60 and to connect the sun gear 41 or the second element with the drive shaft 67 by the fourth gear train of the transmission 60 (FIG. 7) is referred to as a "$3^{rd}$ speed-$4^{th}$ speed simultaneous engagement state" or "third simultaneous engagement state". When torque commands of the motors MG1 and MG2 is set to a value 0 in the $3^{rd}$ speed-$4^{th}$ speed simultaneous engagement state, the power (torque) from the engine 22 can be mechanically (directly) transmitted to the drive shaft 67 at a third fixed speed ratio $\gamma 3$ that is a value between the speed ratio G(3) of the third gear train and the speed ratio G(4) of the fourth gear train $(=(1-\rho) \cdot G(3)+\rho \cdot G(4))$ without conversion to electric energy. The rotational speeds of the sun gear 41 (motor MG1), the ring gear 42 (engine 22) and the carrier 45 (motor MG2) in the $3^{rd}$ speed-$4^{th}$ speed simultaneous engagement state depends on the speed ratio G(3) and G(4) of the transmission 60 and the gear ratio $\rho$ of the power distribution integration mechanism 40 at each vehicle speed. When the clutch C1 is disengaged in the $3^{rd}$ speed-$4^{th}$ speed simultaneous engagement state shown in FIG. 7, as shown by a two-dot chain line in FIG. 8, only the fourth gear 64a (fourth gear train) is fixed to the first motor shaft 46 (sun gear 41) by the clutch C2, and the power from the first motor shaft 46 can be speed-changed in accordance with the speed ratio G(4) of the fourth gear train (fourth gears 64a, 64b) and outputted to the drive shaft 67.

Figure 9:
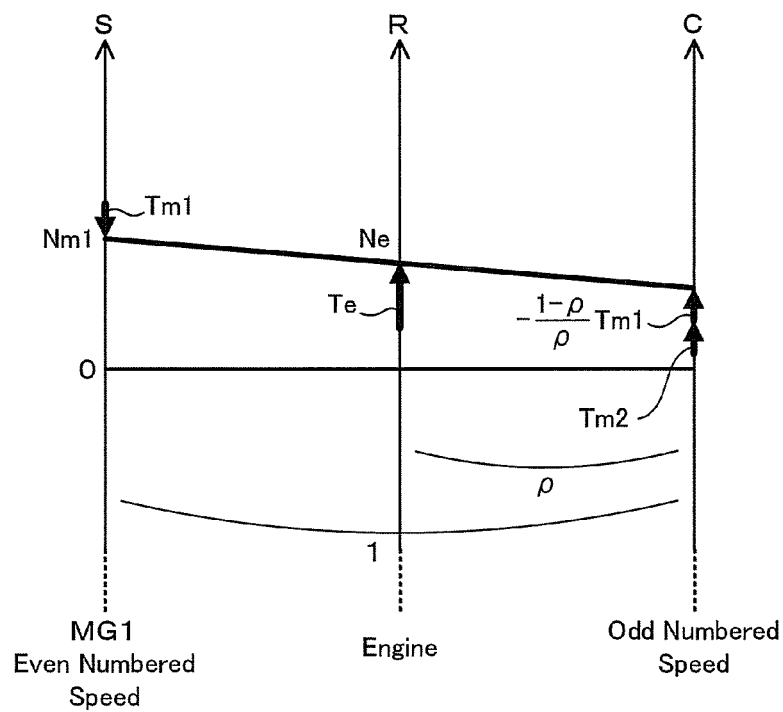
FIG. 9 is an explanatory view exemplifying an alignment chart showing a state of torques and rotational speeds of elements included in the power distribution integration mechanism 40 and a reduction gear mechanism 50 when a motor MG1 is operated as a generator and a motor MG2 is operated as a motor.

When the transmission 60 is set to either the first change speed state or the third change speed state during the drive of the hybrid vehicle 20 with the operation of the engine 22, the motors MG1 and MG2 may be driven and controlled to make the motor MG2, which is connected with the carrier 45 of the power distribution integration mechanism 40 working as the output element, function as the motor and to make the motor MG1, which is connected with the sun gear 41 working as the reactive element, function as the generator. In this state, the power distribution integration mechanism 40 distributes the power from the engine 22 input via the ring gear 42 at its gear ratio $\gamma$ into the sun gear 41 and the carrier 45, while integrating the power from the engine 22 with the power from the motor MG2 functioning as the motor and outputting the integrated power to the carrier 45. Hereafter, a mode of making the motor MG1 function as the generator and making the motor MG2 function as the motor is referred to as "first torque conversion mode". In the first torque conversion mode, the power from the engine 22 goes through torque conversion by means of the power distribution integration mechanism 40 and the motors MG1 and MG2 and is then output to the carrier 45. The ratio of the rotational speed Ne of the engine 22 to the rotational speed of the carrier 45 or the output element is varied continuously in a stepless manner by controlling the rotational speed of the motor MG1. FIG. 9 is an explanatory view exemplifying an alignment chart showing a state of torques and rotational speeds of elements included in the power distribution integration mechanism 40 in the first torque conversion mode. The S-axis, the R-axis, and the C-axis in FIG. 9 represent the same meanings as those in FIGS. 2 to 8. γ represents the gear ratio of the power distribution integration mechanism 40 (number of teeth of the sun gear 41/number of teeth of the ring gear 42). Thick arrows on, the axes represent torques applied to the corresponding elements. Upward arrows show application of positive torques and downward arrows show application of negative torques (these definitions are similarly applied to FIGS. 2 to 8 and FIGS. 10 and 11).

Figure 10:
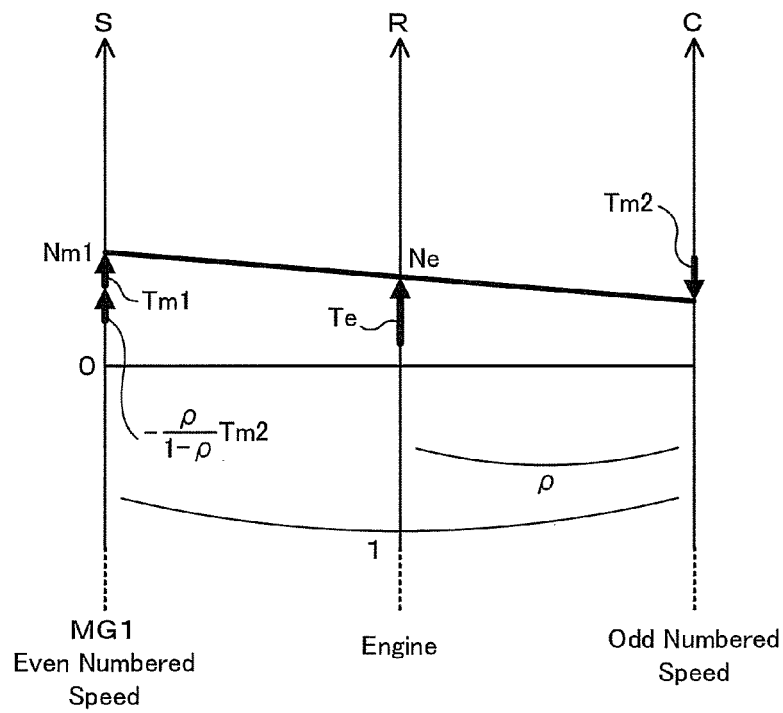
FIG. 10 is an explanatory view exemplifying an alignment chart showing a state of torques and rotational speeds of elements included in the power distribution integration mechanism 40 and a reduction gear mechanism 50 when a motor MG1 is operated as the motor and a motor MG2 is operated as the generator.

When the transmission 60 is set to either the second change speed state or the fourth change speed state during the drive of the hybrid vehicle 20 with the operation of the engine 22, the motors MG1 and MG2 may be driven and controlled to make the motor MG1, which is connected with the sun gear 41 of the power distribution integration mechanism 40 working as the output element, function as the motor and to make the motor MG2, which is connected with the carrier 45 working as the reactive element, function as the generator. In this state, the power distribution integration mechanism 40 distributes the power from the engine 22 input via the ring gear 42 at its gear ratio γ into the sun gear 41 and the carrier 45, while integrating the power from the engine 22 with the power from the motor MG1 functioning as the motor and outputting the integrated power to the sun gear 41. Hereafter, a mode of making the motor MG2 function as the generator and making the motor MG1 function as the motor is referred to as "second torque conversion mode". In the second torque conversion mode, the power from the engine 22 goes through torque conversion by means of the power distribution integration mechanism 40 and the motors MG1 and MG2 and is then output to the sun gear 41. The ratio of the rotational speed Ne of the engine 22 to the rotational speed of the sun gear 41 as the output element is varied continuously in a stepless manner by controlling the rotational speed of the motor MG2. FIG. 10 is an explanatory view exemplifying an alignment chart showing a state of torques and rotational speeds of elements included in the power distribution integration mechanism 40 in the second torque conversion mode.

In the hybrid vehicle 20 of the embodiment, the first torque conversion mode and the second torque conversion mode are alternately switched over with a change of the change speed state (speed ratio) in the transmission 60. Such switchover prevents the rotational speed Nm1 or Nm2 of the motor MG1 or MG2 functioning as the generator from having a negative value with an increase in rotational speed Nm2 or Nm1 of the motor MG2 or MG1 functioning as the motor. This effectively prevents the occurrence of power circulation in the first torque conversion mode, as well as the occurrence of power circulation in the second torque conversion mode. The power circulation in the first torque conversion mode is triggered by the negative rotational speed of the motor MG1 and causes the motor MG2 to consume part of the power output to the carrier shaft 45a and generate electric power, while causing the motor MG1 to consume the electric power generated by the motor MG2 and output driving power. The power circulation in the second torque conversion mode is triggered by the negative rotational speed of the motor MG2 and causes the motor MG1 to consume part of the power output to the first motor shaft 46 and generate electric power, while causing the motor MG2 to consume the electric power generated by the motor MG1 and output driving power. Such prevention of the power circulation desirably improves the power transmission efficiency in a wider drive range. The prevention of the power circulation also reduces the maximum required rotational speeds of the motors MG1 and MG2 and thereby enables size reduction of the motors MG1 and MG2. In the hybrid vehicle 20, the output power of the engine 22 can be mechanically (directly) transmitted to the drive shaft 67 at the fixed speed ratios (fixed speed ratios γ1-γ3) uniquely set for the $1^{st}$ speed-$2^{nd}$ speed simultaneous engagement state, the $2^{nd}$ speed-$3^{rd}$ speed simultaneous engagement state, and the $3^{rd}$ speed fixing state. This desirably increases the potential for mechanical output of the power from the engine 22 to the drive shaft 67 without conversion into electrical energy and thereby further enhances the power transmission efficiency in the wider drive range. In a general power output apparatus equipped with an engine, two motors, and a differential rotation mechanism such as a planetary gear mechanism, the relatively large reduction gear ratio between the engine and a drive shaft increases the potential for conversion of the engine output power into electrical energy. This undesirably decreases the power transmission efficiency and tends to cause heat generation in the motors MG1 and MG2. The simultaneous engagement mode described above is thus especially advantageous for the relatively large reduction gear ratio between the engine 22 and the drive shaft 67.

Figure 11:
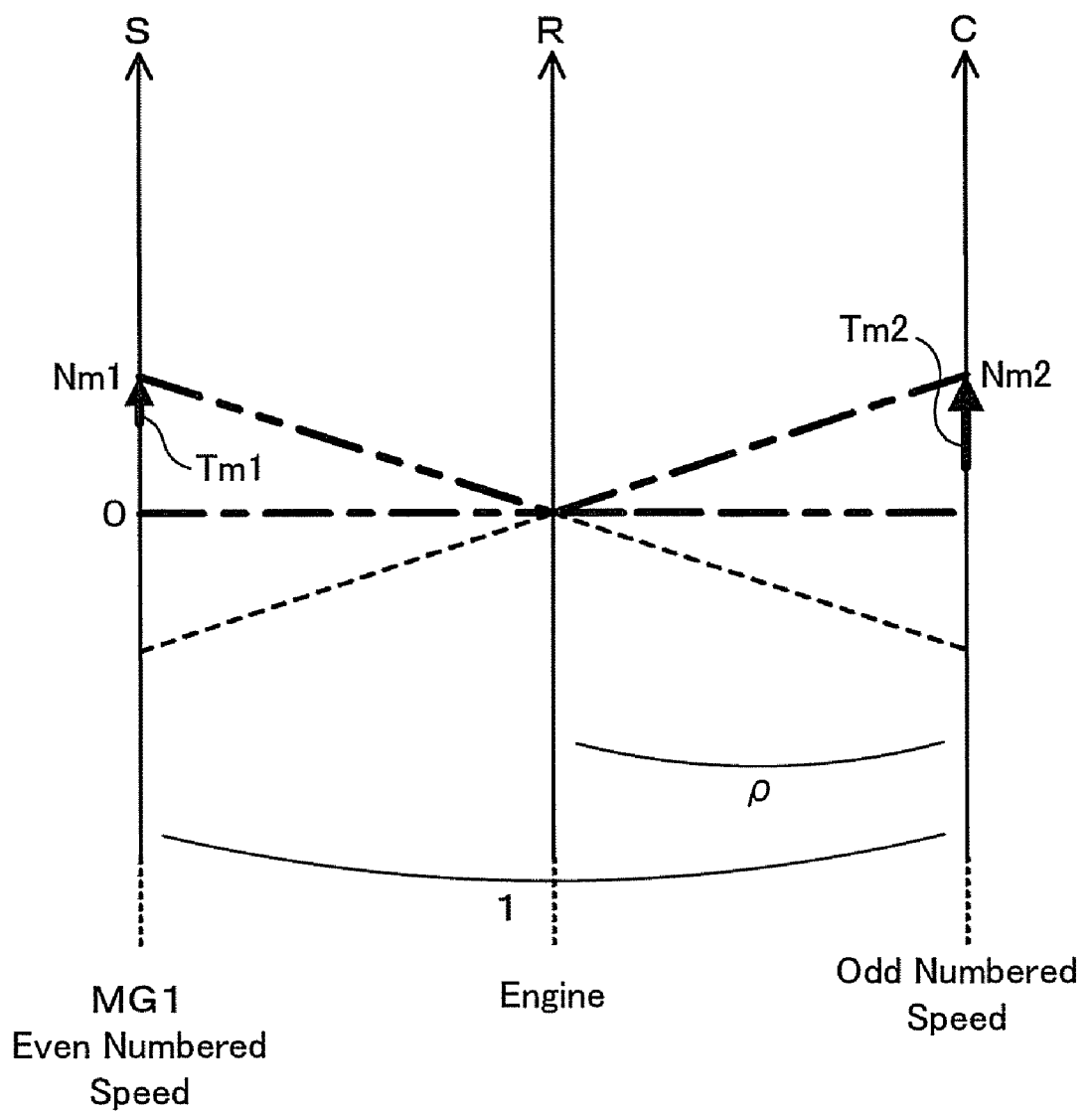
FIG. 11 is an explanatory view for explaining a motor drive mode of the hybrid vehicle 20.

Next, a motor drive mode of the hybrid vehicle 20 will be described with reference to FIG. 11. In the motor drive mode, at least one of the motors MG1 and MG2 is driven with supply of electric power from the battery 35 to output driving power while the engine 22 is stopped. In the hybrid vehicle 20 of the embodiment, the motor drive mode includes a clutch engagement one-motor drive mode, a clutch release one-motor drive mode, and a two-motor drive mode. In the clutch engagement one-motor drive mode, the clutch C0 is engaged, and the first gear 61a of the first gear train or the third gear 63a of the third gear train of the transmission 60 is fixed to the carrier shaft 45a to allow the power output from only the motor MG2, or the second gear 62a of the second gear train or the fourth gear 64a of the fourth gear train of the transmission 60 is fixed to the first motor shaft 46 to allow the power output from only the motor MG1. In the clutch engagement one-motor drive mode, the clutch C0 is set to connect the sun gear 41 of the power distribution integration mechanism 40 with the first motor shaft 46. Accordingly, the motor MG1 or MG2 in the state of no power output thus follows the motor MG2 or MG1 in the state of power output to run idle as shown by the broken line in FIG. 11. In the clutch release one-motor drive mode, the clutch C0 is disengaged, and the first gear 61a of the first gear train or the third gear 63a of the third gear train of the transmission 60 is fixed to the carrier shaft 45a to allow the power output from only the motor MG2, or the second gear 62a of the second gear train or the fourth gear 64a of the fourth gear train of the transmission 60 is fixed to the first motor shaft 46 to allow the power output from only the motor MG1. In the clutch release one-motor drive mode, the clutch C0 is disengaged to disconnect the sun gear 41 from the first motor shaft 46. As shown by the one-dot chain line and the two-dot chain line in FIG. 11, such disconnection effectively avoids a following rotation of the crankshaft 26 of the engine 22 that is stopped, as well as a following rotation of the motor MG1 or MG2 in the state of no power output, thereby preventing a decrease in power transmission efficiency. In the two-motor drive mode, the clutch C0 is disengaged, and at least one of the motors MG1 and MG2 is driven and controlled while the transmission 60 is set in the $1^{st}$ speed-$2^{nd}$ speed simultaneous engagement state, the $2^{nd}$ speed-$3^{rd}$ speed simultaneous engagement state or the $3^{rd}$ speed-$4^{th}$ speed simultaneous engagement state by means of the clutch C1 and C2. Such setting and drive control effectively avoids the following rotation of the engine 22 and enables the power output from both the motors MG1 and MG2 and transmission of a large driving power to the drive shaft 67 in the motor drive mode. This two-motor drive mode is especially suitable for a hill start and ensures the favorable towing performance during the motor drive of the hybrid vehicle 20.

In the hybrid vehicle 20 of the embodiment, the change speed state (speed ratio) of the transmission 60 can be readily changed to enable the efficient power transmission to the drive shaft 67 when the clutch release one-motor drive mode is selected. For example, it is possible the drive mode from the clutch release one-motor drive mode to the two-motor drive mode, that is, the $1^{st}$ speed-$2^{nd}$ speed simultaneous engagement state, the $2^{nd}$ speed-$3^{rd}$ speed simultaneous engagement state or the $3^{rd}$ speed-$4^{th}$ speed simultaneous engagement state by synchronizing the rotational speed of the motor MG1 that is stopped with the rotational speed of the second gear 62a of the second gear train of the fourth gear of the fourth gear train and fixing the second gear 62a or the fourth gear 64a to the first motor shaft 46 when the first gear 61a of the first gear train or the third gear 63a of the third gear train of the transmission 60 is fixed to the carrier shaft 45a to allow the power output from only the motor MG2 in the clutch release one-motor drive mode in the clutch release one-motor drive mode. The output power of the motor MG1 can be transmitted to the drive shaft 67 via the second gear train or the fourth gear train of the transmission 60 by disengaging the clutch C1 of the transmission 60 to allow the power output from only the motor MG1. Thus, in the hybrid vehicle of the embodiment, the transmission 60 is used to change the rotational speed of the carrier shaft 45a and the first motor shaft 46 and amplify the torque in the motor drive mode, thereby desirably reducing the maximum required torques of the motors MG1 and MG2 and enabling size reduction of the motors MG1 and MG2. In the hybrid vehicle 20, the simultaneous engagement mode or the two-motor drive mode is once performed when the speed ratio of the transmission 60 is changed during the motor drive. Accordingly, it is possible to prevent a torque loss upon the change of the speed ratio and to ensure an extremely smooth change of the speed ratio with causing no significant shock. In response to an increase of a driving force demand or a decrease of the state of charge SOC of the battery 35 in the clutch engagement one-motor drive mode, the motor MG1 or MG2 to be made into the state of no power output corresponding to the setting of the speed ratio in the transmission 60 is driven and controlled to crank and start up the engine 22.

Figure 12:
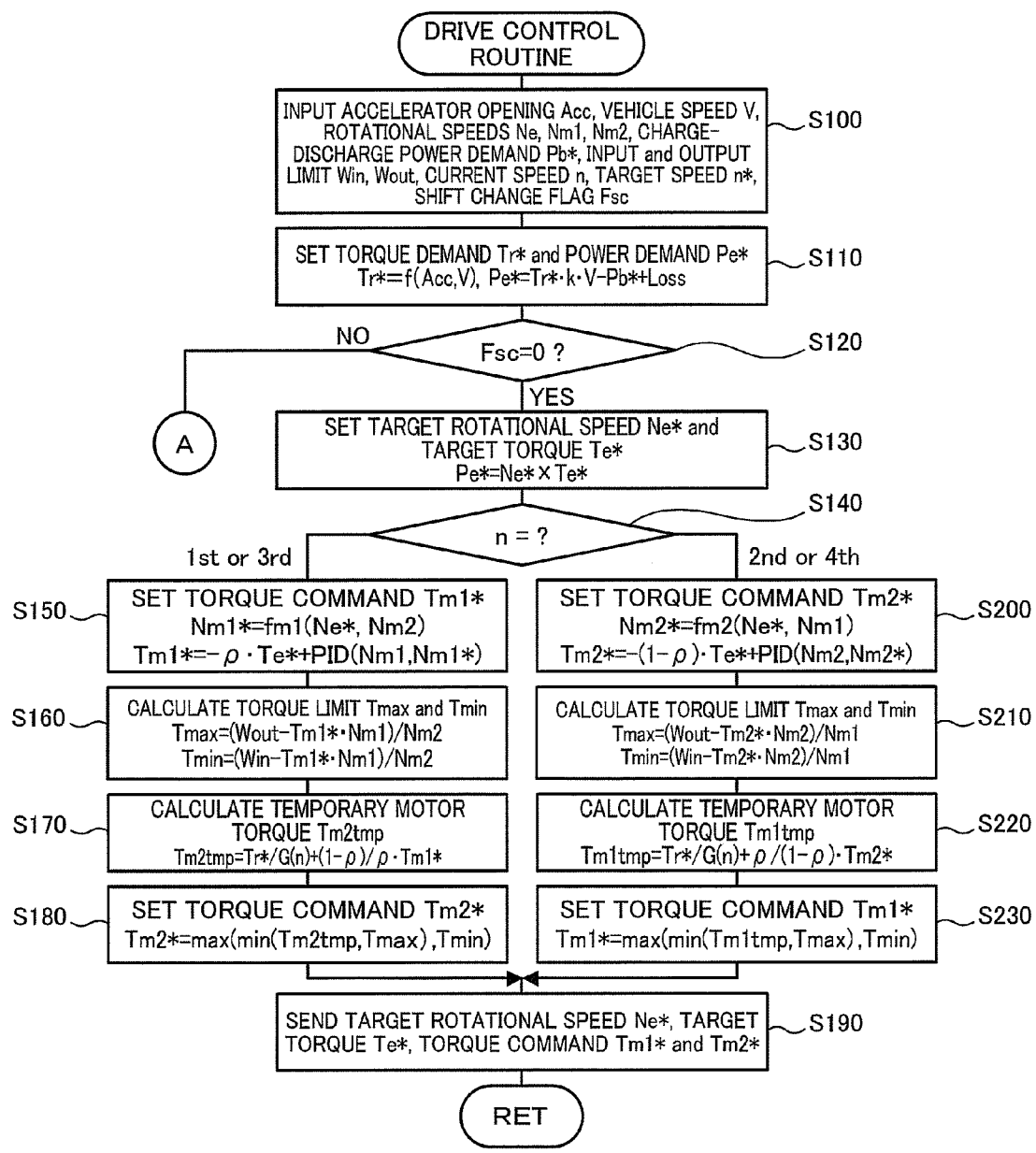
FIG. 12 is a flowchart illustrating an example of a drive control routine executed by a hybrid ECU 70 during the drive of the hybrid vehicle 20 with an engagement of the clutch C0 and the operation of the engine 22.
Figure 13:
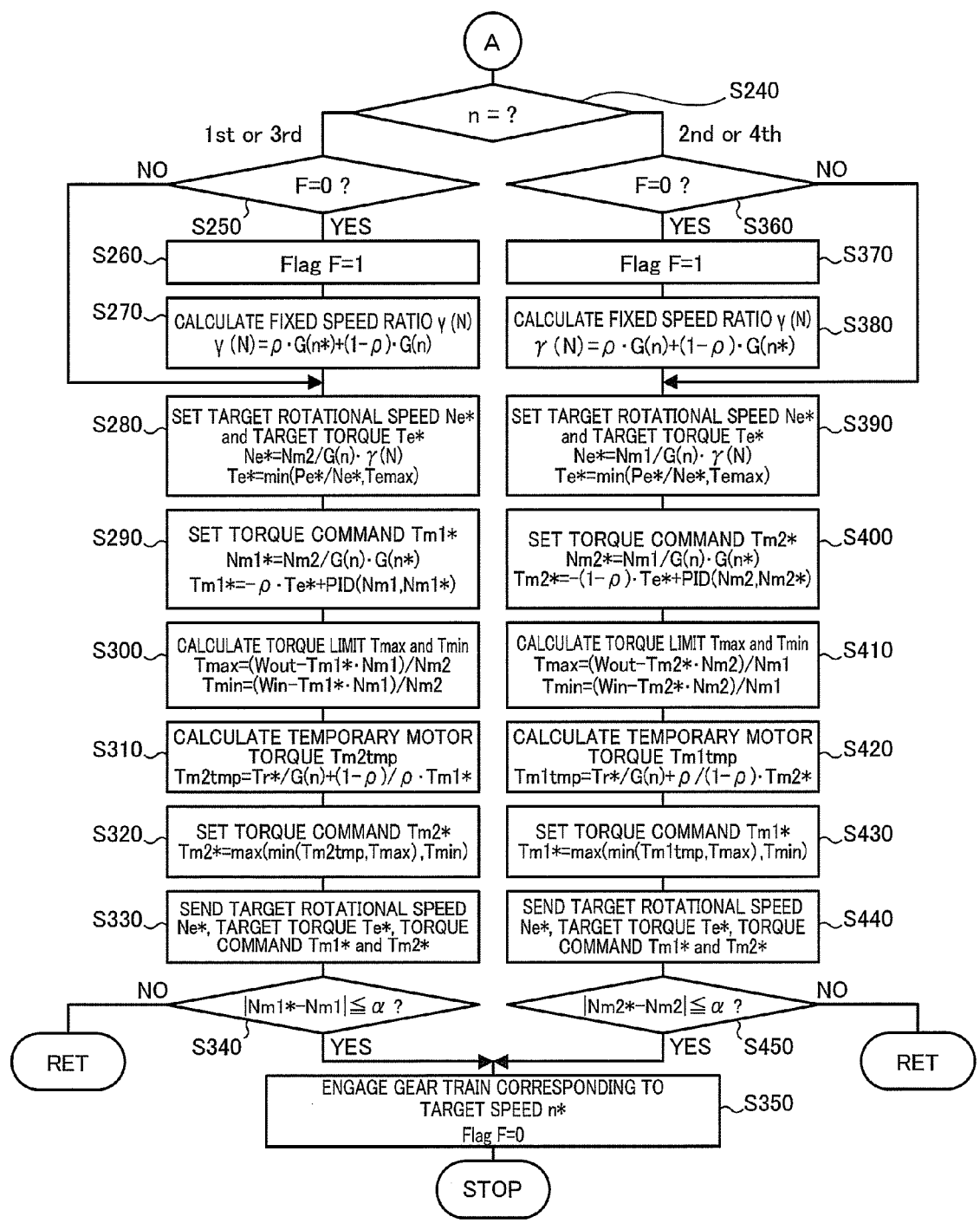
FIG. 13 is a flowchart illustrating an example of a drive control routine executed by the hybrid ECU 70 during the drive of the hybrid vehicle 20 with an engagement of the clutch C0 and the operation of the engine 22.

Referring to FIGS. 12 to 16, a concrete explanation is given on an operation of the hybrid vehicle 20 upon changing the change speed state (speed ratio) of the transmission during the drive of the hybrid vehicle 20 with the engagement of the clutch C0 and the operation of the engine 22. FIGS. 12 and 13 are flowcharts illustrating an example of a drive control routine executed by a hybrid ECU 70 at preset time intervals (for example, at ever several msec) during the drive of the hybrid vehicle 20 with an engagement of the clutch C0 and the operation of the engine 22.

At a start of the drive control routine of FIGS. 12 and 13, the CPU 72 of the hybrid ECU 70 executes an input process of data required for control such as the accelerator opening Acc from the accelerator pedal position sensor 84, the vehicle speed V from the vehicle speed sensor 87, the rotational speed Ne of the engine 22 (crankshaft 26), the rotational speeds Nm1, Nm2 of the motors MG1, MG2, the charge-discharge power demand Pb*, the input and output limits Win and Wout of the battery 35, a current speed n (in the embodiment, n=1, 2, 3 or 4) and the target speed n* (in the embodiment, n*=1, 2, 3 or 4) of the transmission 60, a value of a shift change flag Fsc and the like (Step S100). The rotational speed. Ne of the engine 22 is calculated based on a signal from a crank position sensor (not shown) mounted on the crank shaft 26 by the engine ECU 24 and is input from the engine ECU 24 by communication. The rotation speeds Nm1 and Nm2 of the motors MG1 and MG2 are input from the motor ECU 30 by communication. The charge-discharge power demand Pb* (where positive values represent discharge demands) and the input and output limit Win and Wout of the battery 35 are input from the battery ECU 36 by communication. The current speed n indicates one gear train connecting the carrier shaft 45a or the first motor shaft 46 with the drive shaft 67 among the first to fourth gear trains of the transmission. The current speed n is stored in a predetermined memory region of the RAM 76 when any one of the first to fourth gear trains connects the carrier shaft 45a or the first motor shaft 46 with the drive shaft 67. The target speed n* and the shift change flag Fsc are set through a change speed determination routing that is separately executed by the hybrid ECU 70. The hybrid ECU 70 sets the shift change flag Fsc to value "0" when the change speed state (speed ratio) is maintained and sets the shift change flag Fsc to value "1" when a predetermined change speed state shift condition is satisfied. The change speed state shift condition relates to the vehicle speed V (rotational speed of the drive shaft 67), the accelerator opening Acc and the like and is previously defined in consideration of the transmission efficiency between the engine 22 and the drive shaft 67, performances and heating characteristics of the motors MG1 and MG2, gear ratios G(1)-G(4) of the transmission 60. When the change speed state shift condition is satisfied, the hybrid ECU 70 sets the target speed n* to the sum of the current speed n and value "1" while the hybrid vehicle is accelerated in accordance with the vehicle speed V, the accelerator opening Acc and the like, and sets the target speed n* to a difference obtained by subtracting value "1" from the current speed n while the hybrid vehicle is decelerated in accordance with the vehicle speed V, the accelerator opening Acc and the like.

Figure 14:
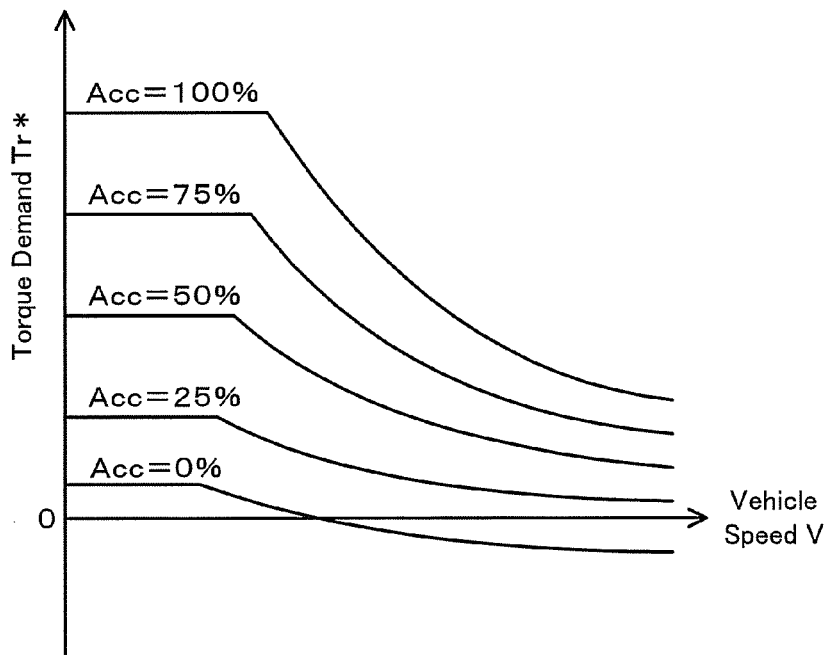
FIG. 14 is an explanatory view illustrating an example of a torque demand setting map.
Figure 15:
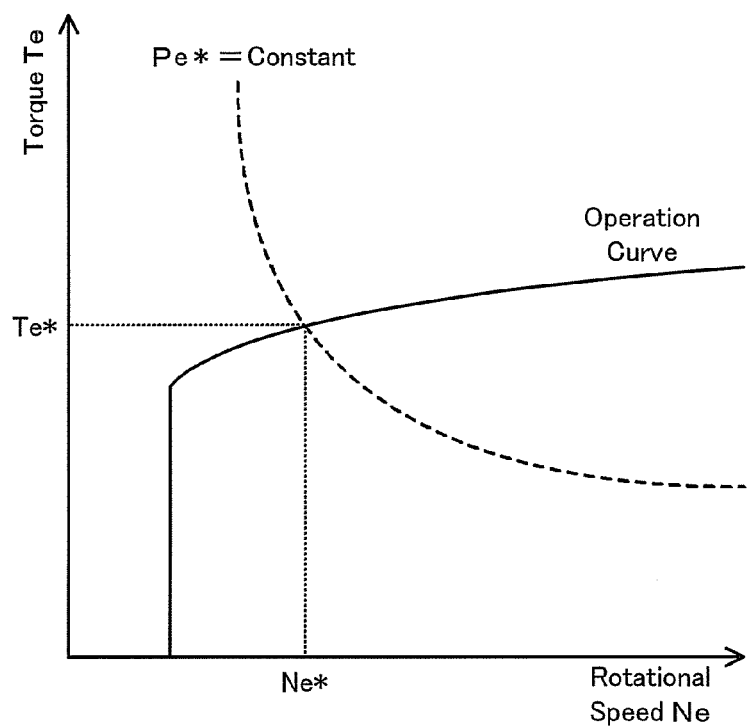
FIG. 15 is an explanatory view illustrating an operation curve of the engine 22 and a correlation curve (constant power curve) between an engine rotational speed Ne and an engine torque Te.

After the input process of data at Step S100, the COU 72 sets a torque demand Tr* to be outputted to the drive shaft 67 based on the input accelerator opening Acc and the input vehicle speed V, and sets a power demand Pe* required for the engine 22 (Step S110). In the embodiment, the torque demand Tr* corresponding to the given accelerator opening Acc and the given vehicle speed V is derived from a torque demand setting map previously stored in the ROM 74 and defining a relationship between the accelerator opening Acc, the vehicle speed V and the torque demand Tr*. FIG. 14 illustrates an example of the torque demand setting map. In the embodiment, the power demand Pe* is calculated as the sum of a product of the set torque demand Tr* and a rotational speed of the drive shaft 67 obtained by multiplying the vehicle speed V by a predetermined conversion factor k, the charge-discharge power demand Pb*, and a potential loss Loss (sum of a mechanical loss in the torque conversion of the power distribution integration mechanism 40 and an electrical loss in driving the motors MG1 and MG2). The drive shaft 67 may be provided with a rotational speed sensor and the rotational speed of the drive shaft 67 measured by the rotational speed sensor may be used for a calculation of the power demand Pe* instead of a product of the vehicle speed V and the predetermined conversion factor k. Then, the CPU 72 determines whether or not the shift change flag Fsc input at Step S100 is value "0" (Step S120). When the shift change flag Fsc is value "0" and the change speed state (speed ratio) of the transmission 60 is not required to change (the change speed state shift condition is not satisfied), the CPU 72 sets a target rotational speed Ne* and a target torque Te* of the engine 22 based on the power demand Pe* set at Step S110 (Step S130). In the embodiment, the target rotational speed Ne* and the target torque Te* are set based on a predetermined operation curve for operating the engine 22 with high efficiency and the power demand Pe*. FIG. 15 is illustrates the operation curve of the engine 22 and a correlation curve (constant power curve) between the engine rotational speed Ne and an engine torque Te. As shown in FIG. 15, the target rotational speed Ne* and the target torque Te* can be obtained from an intersection between the operation curve and the correlation curve indicating a constant power demand Pe* (Ne×Te).

After setting the target rotational speed Ne* and the target torque Te*, the CPU 72 determines whether the current speed n input at Step S100 is value "1", "2", "3" or "4" (the first gear train, the second gear train, the third gear train or the fourth gear train) (Step S140). When the current speed n is value "1" or "3", the transmission 60 connects the carrier shaft 45a with the drive shaft 67. Accordingly, the CPU 72 calculates a target rotational speed Nm1* of the motor MG1 based on the target rotational speed Ne* set at Step S130, the rotational speed (Nm2) of the carrier shaft 45a (carrier 45) and the gear ratio ρ of the power distribution integration mechanism 40 according to Equation (1) given below. Then, CPU 72 sets a torque command Tm1* of the motor MG1 by calculation of below Equation (2) based on the calculated target rotational speed Nm1* and the current rotational speed Nm1 of the motor MG1 (Step S150). The Equation (1) is a dynamic relational expression of respective rotational elements included in the power distribution integration mechanism 40 and is readily obtained from the alignment chart of FIG. 9. The Equation (2) is a relational expression of feedback control to drive and rotate the motor MG1 at the target rotational speed Nm1*. In the Equation (2), 'k11' in a second term and 'k12' in a third term on the right side respectively denote a gain of the proportional term and a gain of the integral term. Then, the CPU 72 calculates torque restrictions Tmin and Tmax as allowable minimum and maximum torques to be output from the motor MG2 by dividing a deviation between the output limit Wout or the input limit Win of the battery 35 and power consumption of the motor MG1 that is a product of the torque command Tm1* and the current rotational speed Nm1 of the motor MG1 by the rotational speed Nm2 of the motor MG2 (Step S160). Further, the CPU 72 calculates a temporary motor torque Tm2tmp as torque to be output from the motor MG2 based on the torque demand Tr*, the torque command Tm1*, the gear ratio G(n) of the gear train corresponding to the current speed n and the gear ratio ρ of the power distribution integration mechanism 40 according to Equation (3) (Step S170). The Equation (3) is readily obtained from the alignment chart of FIG. 9. Then, the CPU 72 sets a torque command Tm2* of the motor MG2 to a value obtained by limiting the calculated temporary motor torque Tm2tmp by the lower and the upper torque restrictions Tmin and Tmax set at Step S160 (Step S180). Setting the torque command Tm2* of the motor MG2 in this manner restricts the torque to be output to the carrier shaft 45a in the range of the input limit Win and the output limit Wout of the battery 35. After setting the target rotational speed Ne* and the target torque Te* of the engine 22 and the torque commands Tm1* and Tm2* of the motors MG1 and MG2, the CPU 72 sends the target rotational speed Ne* and the target torque Te* of the engine 22 to the engine ECU 24 and sends the torque commands Tm1* and Tm2* of the motors MG1 and MG2 to the motor ECU 30 (Step S190) and returns to Step S100 to repeat processes of and after Step S100. The engine ECU 24 receives the target rotational speed Ne* and the target torque Te* and performs control to obtain the target rotational speed Ne* and the target torque Te*. The motor ECU 30 receives the torque commands Tm1* and Tm2* and performs switching control of switching elements included in the respective inverters 41 and 42 so that the motor MG1 is driven in accordance with the torque command Tm1* and the motor MG2 is driven in accordance with the torque command Tm2*.

$$Nm1^* = 1/\rho \cdot (Ne^* - (1-\rho) \cdot Nm2) \tag{1}$$

$$Tm1^* = -\rho \cdot Te^* + k11 \cdot (Nm1^* - Nm1) + k12 \cdot \int (Nm1^* - Nm1) \, dt \tag{2}$$

$$Tm2tmp = Tr^*/G(n) + (1-\rho)/\rho \cdot Tm1^* \tag{3}$$

When the current speed n is value "2" or "4", the transmission 60 connects the first motor shaft 46 with the drive shaft 67. Accordingly, the CPU 72 calculates a target rotational speed Nm2* of the motor MG2 based on the target rotational speed Ne* set at Step S130, the rotational speed Nm1 of the motor MG1 matching with a rotational speed of the first motor shaft 46 (sun gear 41) and the gear ratio ρ of the power distribution integration mechanism 40 according to Equation (4) given below. Then, CPU 72 sets the torque command Tm2* of the motor MG2 by calculation of below Equation (5) based on the calculated target rotational speed Nm2* and the current rotational speed Nm2 of the motor MG2 (Step S200). The Equation (4) is also the dynamic relational expression of respective rotational elements included in the power distribution integration mechanism 40 and is readily obtained from the alignment chart of FIG. 10. The Equation (5) is the relational expression of feedback control to drive and rotate the motor MG2 at the target rotational speed Nm2*. In the Equation (5), 'k21' in the second term and 'k22' in the third term on the right side respectively denote the gain of the proportional term and the gain of the integral term. Then, the CPU 72 calculates torque restrictions Tmin and Tmax as allowable minimum and maximum torques to be output from the motor MG1 by dividing a deviation between the output limit Wout or the input limit Win of the battery 35 and power consumption of the motor MG2 that is a product of the torque command Tm2* and the current rotational speed Nm2 of the motor MG2 by the rotational speed Nm1 of the motor MG1 (Step S210). Further, the CPU 72 calculates a temporary motor torque Tm1tmp as torque to be output from the motor MG1 based on the torque demand Tr*, the torque command Tm2*, the gear ratio G(n) of the gear train corresponding to the current speed n and the gear ratio ρ of the power distribution integration mechanism 40 according to Equation (6) (Step S220). The Equation (6) is readily obtained from the alignment chart of FIG. 10. Then, the CPU 72 sets a torque command Tm1* of the motor MG1 to a value obtained by limiting the calculated temporary motor torque Tm1tmp by the lower and the upper torque restrictions Tmin and Tmax set at Step S210 (Step S230). Setting the torque command Tm1* of the motor MG1 in this manner restricts the torque to be output to the first motor shaft 46 in the range of the input limit Win and the output limit Wout of the battery 35. After setting the target rotational speed Ne* and the target torque Te* of the engine 22 and the torque commands Tm1* and Tm2* of the motors MG1 and MG2, the CPU 72 sends the target rotational speed Ne* and the target torque Te* of the engine 22 to the engine ECU 24 and sends the torque commands Tm1* and Tm2* of the motors MG1 and MG2 to the motor ECU 30 (Step S190) and returns to Step S100 to repeat the processes of and after Step S100.

$$Nm2^* = (Ne^* - \rho \cdot Nm1)/(1-\rho) \quad (4)$$

$$Tm2^* = -(1-\rho) \cdot Te^* + k21 \cdot (Nm2^* - Nm2) + k22 \cdot \int (Nm2^* - Nm2)dt \quad (5)$$

$$Tm1tmp = Tr^*/G(n) + \rho/(1-\rho) \cdot Tm2^* \quad (6)$$

On the other hand, when the shift change flag Fsc is value "1" and the change speed state (speed ratio) of the transmission 60 is required to change (the change speed state shift condition is satisfied), the CPU 72 determines whether the current speed n input at Step S100 is value "1", "2", "3" or "4" (the first gear train, the second gear train, the third gear train or the fourth gear train) as shown in FIG. 13 (Step S240). When the current speed n is value "1" or "3", the CPU 72 determines whether or not a predetermined flag F is value "0" (Step S250). When the flag F is value "0", the CPU 72 sets the flag F to value "1" (Step S260) and calculates a $n^{th}$ fixed speed ratio γ(N) corresponding to the gear ratio ρ of the power distribution integration mechanism 40, the gear ratio G(n) of the gear train corresponding to the current speed n, and a gear ratio G(n*) of the gear train corresponding to the target speed n* as shown in the figure (Step S270). In the embodiment, the value "N" is value "1", "2" or "3" that is settled corresponding to the current speed n and the target speed n*. For example, "N" is value "1" when n=1 and n*=2, and "N" is value "3" when n=4 and n*=3. When the $n^{th}$ fixed speed ratio γ(N) is calculated at Step S270, the flag F has been set to value "1" at Step S260. Accordingly, processes of Steps S260 and S270 are skipped after a next execution of the routine because a negative determination is made at Step S250. After the process of Step S270 or S250, the CPU 72 sets the target rotational speed Ne* and the target torque Te* (Step S280). At Step S280, the target rotational speed Ne* is set to a rotational speed of the engine 22 in an $N^{th}$ simultaneous engagement state corresponding to the rotational speed the drive shaft 67 (vehicle speed V) while considering that the current speed n is value "1" or "3" and the transmission 60 connects the carrier 45 (carrier shaft 45a) and the drive shaft 67. That is, at Step S280, the CPU 72 sets the target rotational speed Ne* of the engine 22 to a product of a quotient (rotational speed of the drive shaft 67) of the rotational speed of the motor MG2 input at Step S100 divided by the gear ratio G(n) of the gear train corresponding to the current speed n and the $n^{th}$ fixed speed ratio γ(N) calculated at Step S270. Further, at Step S280, the CPU 72 sets the target torque Te* of the engine 22 to smaller one of a quotient of the power demand Pe* set at Step S110 divided by the target rotational speed Ne* and a rating toque Temax of the engine 22.

Then, the CPU 72 calculates the rotational speed of the motor MG1 corresponding to the rotational speed of the drive shaft 67 (vehicle speed V) in the $N^{th}$ simultaneous engagement state as the target rotational speed Nm1*, and sets the torque command Tm1* of the motor MG1 according to the above Equation (2) in order to rotationally synchronize the first motor shaft 46 (sun gear 41) and the second gear 62a of the second gear train or the fourth gear 64a of the fourth gear train corresponding to the target speed n* (Step S290). The target rotational speed Nm1* may be obtained by multiplying the quotient (rotational speed of the drive shaft 67) of the rotational speed of the motor MG2 input at Step S100 divided by the gear ratio G(n) of the gear train corresponding to the current speed n by the gear ratio G(n*) of the gear train corresponding to the target speed n*. Further, the CPU 72 executes the same processes as Steps S160-S180 at Steps S300-S320 so as to set the torque command Tm2* of the motor MG2 and sends the target rotational speed Ne* and the target torque Te* of the engine 22 to the engine ECU 24 and sends the torque commands Tm1* and Tm2* of the motors MG1 and MG2 to the motor ECU 30 (Step S330). After a data sending process of Step S330, the CPU 72 determines whether or not an absolute value of a difference between the rotational speed Nm1 of the motor MG1 input at Step S100 and the target rotational speed Nm1* is equal to or less than a predetermined value α (Step S340). When the absolute value of the difference is more than the predetermined value α, the CPU 72 returns to Step S100 to repeat the processes of and after Step S100. On the other hand, when the absolute value of the difference is equal to or less than the predetermined value α, the CPU 72 determined that the first motor shaft 46 (sun gear 41) is rotationally synchronized with the second gear 62a of the second gear train or the fourth gear 64a of the fourth gear train corresponding to the target speed n*. The CPU 72 sends a command signal to the actuator 92 of the clutch C2 so as to fix (engage) the second gear 62a or the fourth gear 64a (the second gear train or the fourth gear train) to (with) the first motor shaft 46 and sets the flag F to value "0" (Step S350). Then, the CPU 72 terminates the routine. The predetermined may be defined as a small value enough to determine that the rotational speed Nm1 substantially matches with the target rotational speed Nm1*.

When the current speed n is value "2" or "4", the CPU 72 determines whether or not the predetermined flag F is value "0" (Step S360). When the flag F is value "0", the CPU 72 sets the flag F to value "1" (Step S370) and calculates the $n^{th}$ fixed speed ratio γ(N) corresponding to the gear ratio ρ of the power distribution, integration mechanism 40, the gear ratio G(n) of the gear train corresponding to the current speed n, and a gear ratio G(n*) of the gear train corresponding to the target speed n* as shown in the figure (Step S380). After the process of Step S360 or S380, the CPU 72 sets the target rotational speed Ne* and the target torque Te* (Step S390). At Step S390, the target rotational speed Ne* is set to a rotational speed of the engine 22 in the $N^{th}$ simultaneous engagement state corresponding to the rotational speed the drive shaft 67 (vehicle speed V) while considering that the current speed n is value "2" or "4" and the transmission 60 connects the sun gear 41 (first motor shaft 46) corresponding to the motor MG1 and the drive shaft 67. That is, at Step S390, the CPU 72 sets the target rotational speed Ne* of the engine 22 to a product of a quotient (rotational speed of the drive shaft 67) of the rotational speed of the motor MG1 input at Step S100 divided by the gear ratio G(n) of the gear train corresponding to the current speed n and the $n^{th}$ fixed speed ratio γ(N) calculated at Step S380. Further, at Step S390, the CPU 72 sets the target torque Te* of the engine 22 to smaller one of the quotient of the power demand Pe* set at Step S110 divided by the target rotational speed Ne* and the rating toque Temax of the engine 22.

Then, the CPU 72 calculates the rotational speed of the motor MG2 corresponding to the rotational speed of the drive shaft 67 (vehicle speed V) in the $N^{th}$ simultaneous engagement state as the target rotational speed Nm2*, and sets the torque command Tm2* of the motor MG2 according to the above Equation (5) in order to rotationally synchronize the carrier 45a (carrier 45) and the first gear 61a of the first gear train or the third gear 63a of the third gear train corresponding to the target speed n* (Step S400). The target rotational speed Nm2* may be obtained by multiplying the quotient (rotational speed of the drive shaft 67) of the rotational speed of the motor MG1 input at Step S100 divided by the gear ratio G(n)

of the gear train corresponding to the current speed n by the gear ratio G(n*) of the gear train corresponding to the target speed n*. Further, the CPU 72 executes the same processes as Steps S210-S230 at Steps S410-S430 so as to set the torque command Tm1* of the motor MG1 and sends the target rotational speed Ne* and the target torque Te* of the engine 22 to the engine ECU 24 and sends the torque commands Tm1* and Tm2* of the motors MG1 and MG2 to the motor ECU 30 (Step S440). After a data sending process of Step S440, the CPU 72 determines whether or not an absolute value of a difference between the rotational speed Nm2 of the motor MG2 input at Step S100 and the target rotational speed Nm2* is equal to or less than a predetermined value α (Step S450). When the absolute value of the difference is more than the predetermined value α, the CPU 72 returns to Step S100 to repeat the processes of and after Step S100. On the other hand, when the absolute value of the difference is equal to or less than the predetermined value α, the CPU 72 determined that the carrier shaft 45a (carrier 45) is rotationally synchronized with the first gear 61a of the first gear train or the third gear 63a of the third gear train corresponding to the target speed n*. The CPU 72 sends a command signal to the actuator 91 of the clutch C1 so as to fix (engage) the first gear 61a or the third gear 63a (the first gear train or the third gear train) to (with) the carrier shaft 45a and sets the flag F to value "0" (Step S350). Then, the CPU 72 terminates the routine.

Figure 16:
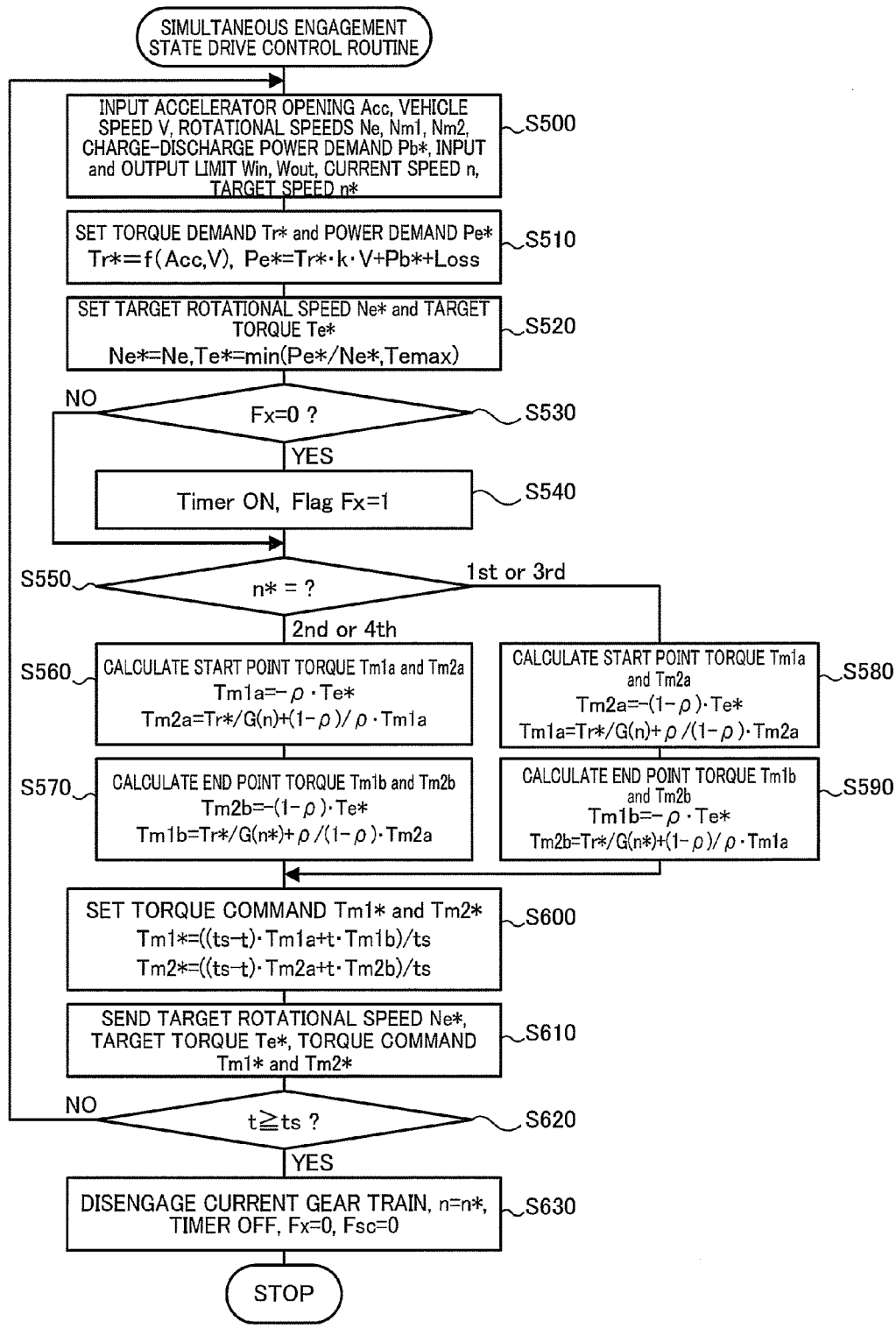
FIG. 16 is a flowchart illustrating an example of a simultaneous engagement state drive control routine executed by the hybrid ECU 70.

As described above, when the shift change flag Fsc is set to value "1" while the transmission connects one of the carrier shaft 45a and the first motor shaft 46 with the drive shaft 67, the engine 22 is operated and the motors MG1 and MG2 are driven and controlled, the transmission 60 connects the other of the sun gear 41 and the carrier 45 with the drive shaft 67 (Step S350) after a rotational speed adjustment process (Steps S240-S340 or S240 and S360-S440) of conforming the rotational speed of the motor MG1 or MG2 corresponding to the other of the sun gear 41 (first motor shaft 46) and the carrier 45 (carrier shaft 45a) that has not connected with the drive shaft 67 to the target rotational speed Nm1* or Nm2* based on the gear ratio G(1)-G(4) of the transmission 60 and the rotational speed of the drive shaft 67 (vehicle speed V). Thus, the first motor shaft 46 or the carrier shaft 45a can be appropriately connected with the drive shaft 67 by the gear train corresponding to the target speed n* while connecting the carrier shaft 45a or the first motor shaft 46 with the drive shaft 67 by the gear train corresponding to the current speed n and reducing the shock, thereby implementing the simultaneous engagement state corresponding to the current speed n and the target speed n*. A termination of the drive control routine of FIGS. 12 and 13 after the process of Step S350, a simultaneous engagement state drive control routine shown in FIG. 16 is executed by the hybrid ECU 70.

Next, the simultaneous engagement state drive control routine of FIG. 16 will be described. At a start of the simultaneous engagement state drive control routine, the hybrid ECU 70 executes an input process of data required for control such as the accelerator opening Acc from the accelerator pedal position sensor 84, the vehicle speed V from the vehicle speed sensor 87, the rotational speed Ne of the engine 22, the rotational speeds Nm1, Nm2 of the motors MG1, MG2, the charge-discharge power demand Pb*, the input and output limits Win and Wout of the battery 35, the current speed n and the target speed n* and the like (Step S500) and sets the torque demand Tr* and the power demand Pe* as in the case of Step S110 in FIG. 12 (Step S510). Further, the CPU 72 sets the target rotational speed Ne* of the engine 22 to the rotational speed Ne input at Step S500 and sets the target torque Te* of the engine 22 to smaller one of a quotient of the power demand Pe* set at Step S510 divided by the target rotational speed Ne* (=Ne) and the rating toque Temax of the engine 22 (Step S520). Then, the CPU 72 determines whether or not a predetermined flag Fx is value "0" (Step S530). When the flag Fx is value "0", the CPU 72 sets the timer 78 on and sets the flag Fx to value "1" (Step S40). Once the flag Fx is set to value "1" at Step S540, a process of Step S540 is skipped after a next execution of the routine because a negative determination is made at Step S530.

After the process of Step S530 or S540, the CPU 72 determines whether the target speed n* input at Step-S500 is value "1", "2", "3" or "4" (the first gear train, the second gear train, the third gear train or the fourth gear train) (Step S550). When the target speed n* is value "2" or "4", as shown in Equation (7) given below, the CPU 72 sets a start point torque Tm1a to a motor torque demand of the motor MG1 based on the target torque Te* of the engine 22 set at Step S520 in a pre-change speed state before the $N^{th}$ simultaneous engagement state where the transmission 60 connects both the carrier shaft 45a and the first motor shaft 46 with the drive shaft 67, that is, in a state where only the carrier shaft 45a is connected with the drive shaft 67 by the first or third gear train corresponding to the current speed n (Step S560). At the Step S560, the CPU 72 also sets a start point torque Tm2a to a motor torque demand of the motor MG2 based on the start point torque Tm1a (the target torque Te*), the torque demand Tr* set at Step S510 and the gear ratio G(n) of the gear train corresponding to the current speed n as shown in Equation (8) given below. Further, as shown in Equation (9) given below, the CPU 72 sets an end point torque Tm2b to a motor torque demand of the motor MG2 based on the target torque Te* of the engine 22 set at Step S520 in a post-change speed state after the $N^{th}$ simultaneous engagement state where the transmission 60 connects both the carrier shaft 45a and the first motor shaft 46 with the drive shaft 67, that is, in a state where only the first motor shaft 46 is connected with the drive shaft 67 by the second or fourth gear train corresponding to the target speed n* (Step S570). At the Step S570, the CPU 72 also sets an end point torque Tm1b to a motor torque demand of the motor MG1 based on the end point torque Tm2b (the target torque Te*), the torque demand Tr* set at Step S510 and the gear ratio G(n*) of the gear train corresponding to the target speed n* as shown in Equation (0) given below.

$$Tm1a = -\rho \cdot Te \quad (7)$$

$$Tm2a = Tr^*/G(n) + (1 \cdot \rho)/\rho \cdot Tm1a \quad (8)$$

$$Tm2b = -(1-\rho) \cdot Te^* \quad (9)$$

$$Tm1b = Tr^*/G(n^*) + \rho/(1-\rho) \cdot Tm2a \quad (10)$$

When the target speed n* is value "1" or "3", as shown in Equation (11) given below, the CPU 72 sets a start point torque Tm2a to a motor torque demand of the motor MG2 based on the target torque Te* of the engine 22 set at Step S520 in a pre-change speed state before the $N^{th}$ simultaneous engagement state where the transmission 60 connects both the carrier shaft 45a and the first motor shaft 46 with the drive shaft 67, that is, in a state where only the first motor shaft 46 is connected with the drive shaft 67 by the second or fourth gear train corresponding to the current speed n (Step S580). At the Step S580, the CPU 72 also sets a start point torque Tm1a to a motor torque demand of the motor MG1 based on the start point torque Tm2a (the target torque Te*), the torque demand Tr* set at Step S510 and the gear ratio G(n) of the gear train corresponding to the current speed n as shown in Equation (12) given below. Further, as shown in Equation

(13) given below, the CPU 72 sets an end point torque Tm1*b* to a motor torque demand of the motor MG1 based on the target torque Te* of the engine 22 set at Step S520 in a post-change speed state after the $N^{th}$ simultaneous engagement state where the transmission 60 connects both the carrier shaft 45*a* and the first motor shaft 46 with the drive shaft 67, that is, in a state where only the carrier shaft 45*a* is connected with the drive shaft 67 by the first or third gear train corresponding to the target speed n* (Step S590). At the Step S590, the CPU 72 also sets an end point torque Tm2*b* to a motor torque demand of the motor MG2 based on the end point torque Tm1*b* (the target torque Te*), the torque demand Tr* set at Step S510 and the gear ratio G(n) of the gear train corresponding to the target speed n* in the post-change speed state as shown in Equation (14) given below.

$$Tm2a = -(1-\rho) \cdot Te^* \tag{11}$$

$$Tm1a = Tr^*/G(n) + \rho/(1-\rho) \cdot Tm2a \tag{12}$$

$$Tm1b = -\rho \cdot Te^* \tag{13}$$

$$Tm2b = Tr^*/G(n^*) + (1-\rho)/\rho \cdot Tm1a \tag{14}$$

After setting the start point torque Tm1*a*, Tm2*a* and the end point torque Tm1*b*, Tm2*b* at Steps S560 and S570 or Steps S580 and S590, the CPU 72 executes calculations of Equations (15) and (16) given below based on the calculated start point torque Tm1*a*, Tm2*a*, the calculated end point torque Tm1*b*, Tm2*b*, an elapsed time t measured by the timer 78 and a predetermined transfer time is so as to set the torque commands of the motors MG1 and MG2 (Step S600). That is, Step S600 sets the torque commands Tm1* and Tm2* of the motors MG1 and MG2 so that output torques of the motors MG1 and MG2 gradually change from the start point torques to the end point torques within the torque transfer time ts. The torque transfer time ts is previously set to minimal time in consideration of characteristics of the motors MG1 and MG2 and a torque shock in the drive shaft 67. After setting the torque commands Tm1* and Tm2*, the CPU 72 sends the target rotational speed Ne* and the target torque Te* of the engine 22 to the engine ECU 24 and sends the torque commands Tm1* and Tm2* of the motors MG1 and MG2 to the motor ECU 30 (Step S610). After a data sending process of Step S610, the CPU 72 determines whether or not the elapsed time t measured by the timer 78 is equal to or more than the torque transfer time ts (Step S620). When the elapsed time t is less than the torque transfer time ts, the CPU 72 returns to Step S500 to repeat the processes of and after Step S500. While repeatedly executing the processes from Step S500 to Step S610, the start point torques Tm1*a* and Tm2*a* that are the motor torque demands of the motors MG1 and MG2 in the pre-change speed state and the end point torques Tm1*b* and Tm2*b* that are the motor torque demands of the motors MG1 and MG2 in the post-change speed state are calculated every time the torque demand Tr* is set at Step S510. Then, a transfer of power between the motors MG1 and MG2 based on the start point torques Tm1*a* and Tm2*a* and the end point torques Tm1*b* and Tm2*b* is executed so that the motors MG1 and MG2 respectively output torque required in the post-change speed state corresponding to the target speed n* when the torque transfer time ts is substantially elapsed after the start of the routine. When the elapsed time t is equal to or more than the torque transfer time ts, the CPU 72 sends a command signal to the actuator 91 or 92 of the clutch C1 or C2 so as to disconnect the carrier shaft 45*a* or the first motor shaft 46 from the gear train corresponding to the current speed n and sets both the flag Fx and the shift change flag Fsc to value "0" (Step S630). Then, the CPU 72 terminates the routine. Thus, it is possible to appropriately switch between the connection between the carrier 45 (carrier shaft 45*a*) of the power distribution integration mechanism 40 and the drive shaft 67 and the connection between the sun gear 41 (first motor shaft 46) and the drive shaft 67, so that the change speed state (speed ratio) of the transmission 60 can be changed into a state corresponding to the target speed n*. After changing the change speed state (speed ratio) of the transmission 60, the drive control routine shown in FIGS. 12 and 13 is executed.

$$Tm1^* = ((ts-t) \cdot Tm1a + t \cdot Tm1b)/ts \tag{15}$$

$$Tm2^* = ((ts-t) \cdot Tm2a + t \cdot Tm2b)/ts \tag{16}$$

As has been described above, the hybrid vehicle 20 of the embodiment includes the transmission 60 configured to selectively connect either one or both of the carrier 45 (first element) and the sung gear 41 (second element) of the power distribution integration mechanism 40 with the drive shaft 67 and to transmit power from the carrier 45 and power from the sun gear 41 at the predetermined speed ratio G(1), G(3), or G(2), G(3) to the drive shaft 67. When the shift change flag Fsc is set to value "1" (the change speed state shift condition is satisfied) while the one of the carrier 45 and the sun gear 41 is connected with the drive shaft 67 by the gear train of the transmission 60 corresponding to the current speed n, the engine 22 is operated and the motors MG1, MG2 are driven and controlled, the one of the carrier 45 and the sun gear 41 of the power distribution integration mechanism 40 is disconnected from the drive shaft 67 and the other of the carrier 45 and the sun gear 41 is connected with the drive shaft 67. Namely, the hybrid vehicle 20 ensures torque equivalent to the set torque demand Tr* and connects the other of the carrier 45 and the sun gear 41 with the drive shaft 67 by the gear train corresponding to the target speed n* of the transmission 60 (Step S350 of FIG. 13) after the rotational speed adjustment process (Steps S240-S340 or S240 and S360-S450 of FIG. 13) of conforming the rotational speed Nm1 or Nm2 of the motor MG1 or MG2 corresponding to the other of the carrier 45 (carrier shaft 45*a*) and the sun gear 41 (first motor shaft 46) that has not connected with the drive shaft 67 to the target rotational speed Nm1* or Nm2* based on the gear ratios G(1)-G(4) of the transmission 60 and the rotational speed of the drive shaft 67. Further, the hybrid vehicle 20 ensures torque equivalent to the set torque demand Tr* and releases the connection between the drive shaft 67 and the one of the sun gear 45 and the sun gear 41 by the gear train corresponding to the current speed n of the transmission 60 (Step S630 of FIG. 16) after the power transfer process (Steps S500-S620 of FIG. 16) of transferring power between the motors MG1 and MG2 while both of the carrier 45 and the sun gear 41 are connected with the drive shaft 67 by the gear train corresponding to the current speed n and the gear train corresponding to the target speed n* so as to make the motors MG1 and MG2 respectively output power required in the post-change speed state where only the other of the carrier 45 and the sun gear 41 is connected with the drive shaft 67. By performing the rotational speed adjustment process when the transmission 60 connects the one of the carrier 45 and the sun gear 41 of the power distribution integration mechanism 40 with the drive shaft 67, the other of the sun gear 41 (first motor shaft 46) and carrier 45 (carrier shaft 45*a*) that has not connected with the drive shaft 67 can be appropriately connected with the drive shaft 67 while reducing the shock, thereby implementing the $N^{th}$ simultaneous engagement state where both of the carrier 45 and the sun gear 41 are connected with the drive shaft 67. Further, by disconnecting the other of the carrier 45 and the sun gear 41 from the drive shaft 67 after the power transfer process in the $N^{th}$ simultaneous engagement state, it is possible to appropriately switch between the connection between the carrier 45 (carrier shaft 45a) and the drive shaft 67 and the connection between the sun gear 41 (first motor shaft 46) and the drive shaft 67 while reducing shock due to a change of torque output to the drive shaft 67 and strains on the clutches C1 and C2. Accordingly, the hybrid vehicle 20 of the embodiment appropriately changes connection states between the drive shaft 67 and the carrier 45 and the sun gear 41 of the power distribution integration mechanism 40, thereby improving transmission efficiency of power in a wider driving region.

The power transfer process in the hybrid vehicle 20 of the embodiment sets, at timing when the torque demand Tr* has been set, start point torques Tm1a and Tm2a of the motors MG1 and MG2 to motor torque demands of the motors MG1 and MG2 in the pre-change speed state before the transmission 60 connects both of the carrier 45 and the sun gear 41 with the drive shaft 67, based on the torque demand Tr* and the target torque (engine torque demand) Te* of the engine 22 based on the torque demand Tr* (Step S560 or S580 of FIG. 16). The hybrid vehicle 20 of the embodiment also sets, at timing when the torque demand Tr* has been set, end point torques Tm1b and Tm2b of the motors MG1 and MG2 to motor torque demands of the motors MG1 and MG2 in the post-change speed state after the transmission 60 disconnects the one of the carrier 45 and the sun gear 41 from the drive shaft 67, based on the torque demand Tr* and the target torque (engine torque demand) Te* of the engine 22 based on the torque demand Tr* (Step S570 or S590 of FIG. 16). Then, the hybrid vehicle 20 of the embodiment controls the engine 22, the motors MG1 and MG2 so that the engine 22 outputs torque equivalent to the target torque Te* and output torques of the motors MG1 and MG2 gradually change from the start point torques Tm1a, Tm2a to the end point torques Tm1b, Tm2b. That is, during the power transfer process, the motor torque demands in the pre-change speed state based on the torque demand Tr* and the target torque Te* of the engine 22 upon the predetermined timing are set as start points and the motor torque demands in the post-change speed state based on the torque demand Tr* and the target torque Te* of the engine 22 upon the predetermined timing are set as end points. Then, the output torques of the motors MG1 and MG2 are changed from the start points to the end points. Thus, the power transfer process can be appropriate for making the motors MG1 and MG2 respectively output torque required in the post-change speed state where only the other of the carrier 45 and sun gear 41 is connected with the drive shaft 67. Further, during the power transfer process, the start and end point torques Tm1a, Tm2a, Tm1b, and Tm2b of the motors MG1 and MG2 are set every time the torque demand Tr* has been set and the output torques of the motors MG1 and MG2 are gradually changed from the start point torques Tm1a, Tm2a to the end point torques Tm1b, Tm2b. Thus, the torque can be transferred between the motors MG1 and MG2 while reducing shock due to the change of toque output to the drive shaft 67 and handling the change of the torque demand Tr*. Further, setting the start and end point torques Tm1a, Tm2a, Tm1b and Tm1b every time the torque demand Tr* has been set enables to return to the pre-change speed state while reducing shock due to the change of torque and handling the change of the torque demand Tr* even if a shift to the post-change speed state is discontinued.

In the drive control routine of FIG. 13, the process of Step S350 is executed when determined that the absolute value of the difference between the actual rotational speed Nm1 or Nm2 of the motor MG1 or MG2 and the target rotational speed Nm1* or Nm2* is equal to or less than the predetermined value α at Step S340 or S450. However, the present invention is not limited to this. That is, the processes of Steps S340 and S450 may be a process of determining whether or not a predetermined time elapses after the absolute value of the difference becomes a value within a predetermined range. Thus, the carrier 45 (carrier shaft 45a) or the sun gear 41 (first motor shaft 46) can be favorably synchronized with the gear of the gear train corresponding to the target speed n* and the carrier shaft 45a or the first motor shaft 46 can be fixed to the gear train corresponding to the target speed n*.

Figure 17:
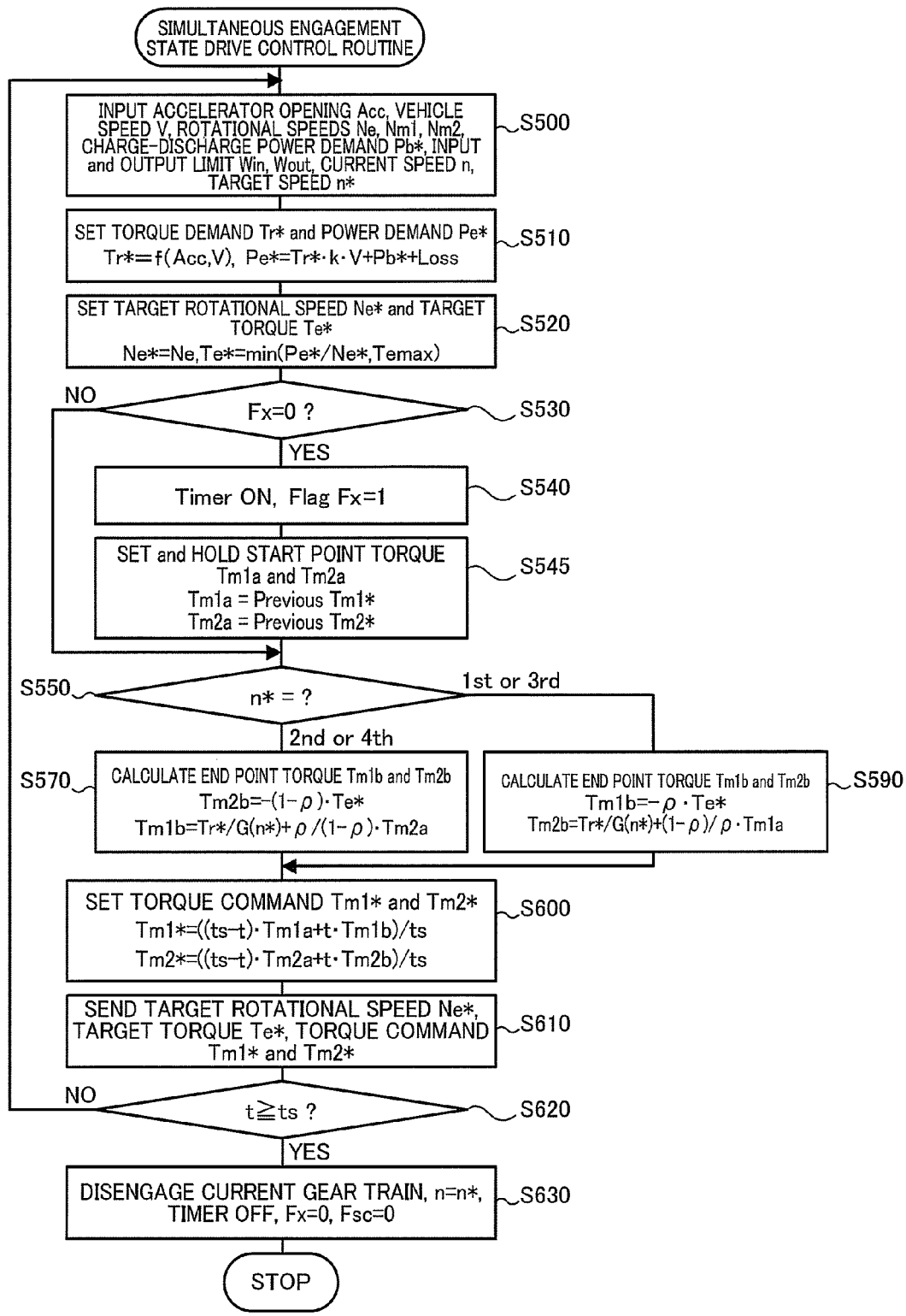
FIG. 17 is a flowchart illustrating another example of the simultaneous engagement state drive control routine executed by the hybrid ECU 70.

FIG. 17 is a flowchart illustrating another example of the simultaneous engagement state drive control routine executed in the above hybrid vehicle 20. This routine is also executed by the hybrid ECU 70 when the gear train corresponding to the target speed n* connects the first motor shaft 46 or the carrier shaft 45a with the drive shaft 67 at Step S350 while the gear train corresponding to the current speed n connects the carrier shaft 45a or the first motor shaft 46 with the drive shaft 67. Like the routine of FIG. 16, the simultaneous engagement state drive control routine of FIG. 17 includes the processes of Steps S500-S540, S550, s570, S590 and S600-S630. The routine of FIG. 17 includes a process of Step S545 after Step S540 instead of the processes of Step S560 and S580 of FIG. 16. The process of Step S545 is a process of setting and holding a previous value of the torque command Tm1* as the start point torque Tm1a of the motor MG1, and setting and holding a previous value of the torque command Tm2* as the start point torque Tm2a of the motor MG2. As seen from FIG. 17, once the flag Fx is set to value "1" at Step S540, processes of Step S540 and S545 are skipped after the next execution of the routine because the negative determination is made at Step S530. That is, the process of Step S545 is executed only once just after a start of the routine of FIG. 17. Thus, after the start of the simultaneous engagement state drive control routine of FIG. 17, the processes of Step S500-S540 are executed and the start point torques Tm1a and Tm2a are set to previous values of the torque commands Tm1* and Tm2*, that is, motor torque demands of the motors MG1 and MG2 based on the torque demand Tr* set just before the transmission 60 connects both of the carrier 45 (carrier shaft 45a) and the sun gear 41 (first motor shaft 46) with the drive shaft 67 and the target torque Te* (engine torque demand) of the engine 22 based on the torque demand Tr* (Step S545). During the power transfer process (while repeatedly executing the routine), the end point torques Tm1b and Tm2b of the motors MG1 and MG2 in the post-change speed state are calculated based on the torque demand Tr* and the target torque Te* of the engine 22 every time the torque demand Tr* has bee set (Step S570 or S590). Then, the engine 22, the motors MG1 and MG2 are controlled so that the engine 22 outputs torque equivalent to the target torque Te* and output torques of the motors MG1 and MG2 gradually changes from the start point torques Tm1a, Tm2a that are set at Step S545 executed only once just after the start of the routine to the end point torques Tm1b, Tm2b that are set each execution of the routine (Steps S600-S620). According to the simultaneous engagement state drive control routine of FIG. 17, the torque can be transferred between the motors MG1 and MG2 while reducing shock due to the change of torque output to the drive shaft 67 and handling the change of the torque Further, it is possible to lighten a computation load in the power transfer process by setting the start point torques Tm1a and Tm2a only just after the start of the simultaneous engagement state drive control routine (power transfer process).

Figure 18:
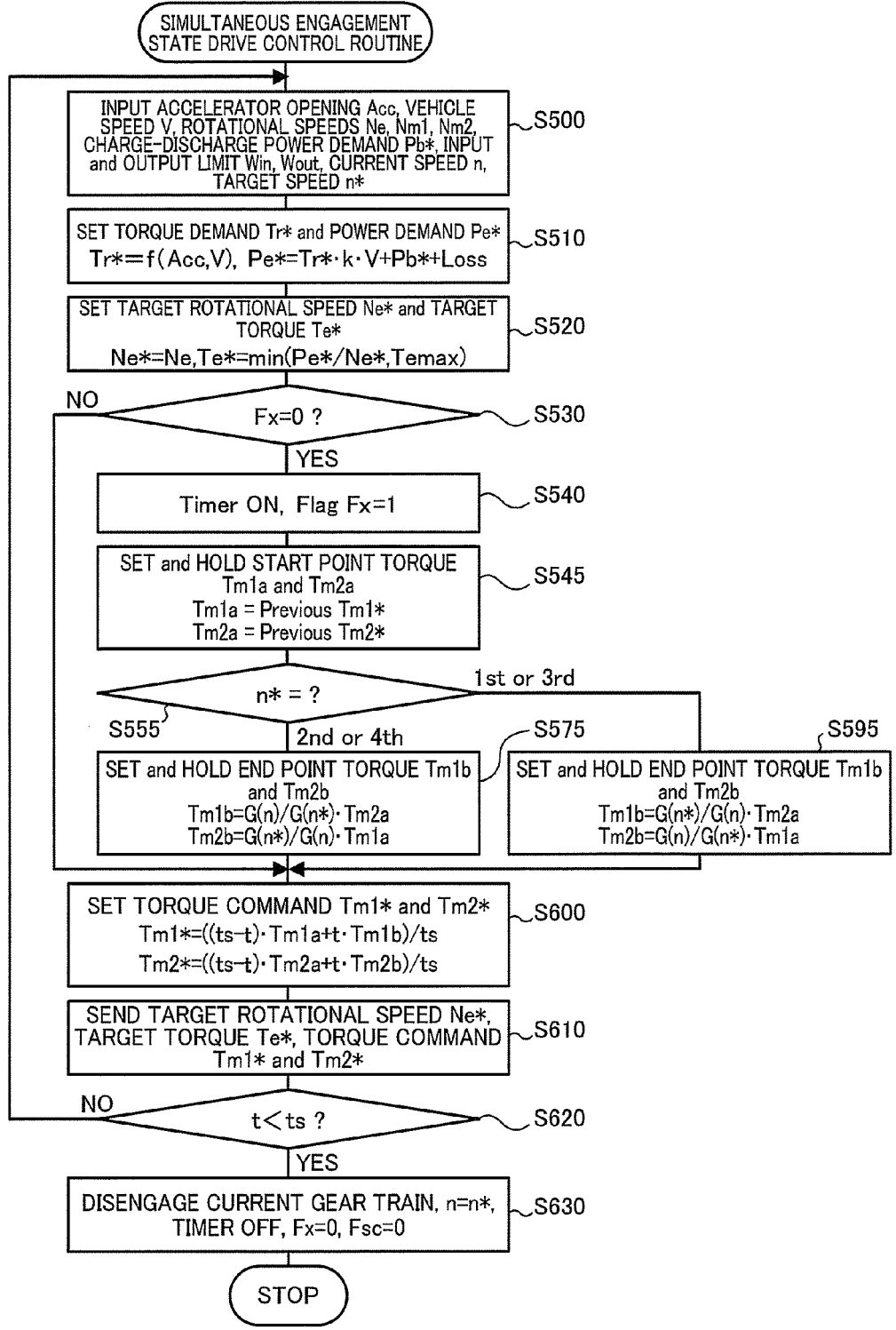
FIG. 18 is a flowchart illustrating still another example of the simultaneous engagement state drive control routine executed by the hybrid ECU 70.

FIG. 18 is a flowchart illustrating still another example of the simultaneous engagement state drive control routine executed in the above hybrid vehicle 20. This routine is also executed by the hybrid ECU 70 when the gear train corresponding to the target speed n* connects the first motor shaft 46 or the carrier shaft 45a with the drive shaft 67 at Step S350 while the gear train corresponding to the current speed n connects the carrier shaft 45a or the first motor shaft 46 with the drive shaft 67. Like the routine of FIG. 17, the simultaneous engagement state drive control routine of FIG. 18 includes the processes of Steps S500-S545, and S600-S630. The routine of FIG. 18 includes a determination process of the target speed n* (S555), processes of Steps S575 and S595 between Step S545 and Step S600 instead of the processes of Step S550, S570 and S590 of FIG. 17. The process of Step S575 and S595 are processes of setting the end point torques Tm1b and Tm2b of the motors MG1 and MG2 based on the start points torques Tm1a, Tm2a set and held at Step S545 and speed ratios of the transmission 60 between the carrier 45 (carrier shaft 45a) or the sun gear 41 (first motor shaft) and the drive shaft 67 in the pre-change speed state and the post-change speed state (the gear ratio G(n) of the gear train corresponding to the current speed n and the gear ratio G(n*) of the gear train corresponding to the target speed n*). As seen from FIG. 18, once the flag Fx is set to value "1" at Step S540, processes of Step S540-S555 and S575 or S595 are skipped after the next execution of the routine because the negative determination is made at Step S530. That is, the processes of Step S545-S555 and S575 or S595 are executed only once just after a start of the routine of FIG. 18. Thus, after the start of the simultaneous engagement state drive control routine of FIG. 18, the processes of Step S500-S540 are executed and the start point torques Tm1a and Tm2a are set to previous values of the torque commands Tm1* and Tm2*, that is, motor torque demands of the motors MG1 and MG2 based on the torque demand Tr* set just before the transmission 60 connects both of the carrier 45 (carrier shaft 45a) and the sun gear 41 (first motor shaft 46) with the drive shaft 67 and the target torque Te* (engine torque demand) of the engine 22 based on the torque demand Tr* (Step S545). Further, the end point torques Tm1b and Tm2b of the motors MG1 and MG2 based on the start points torques Tm1a, Tm2a set at Step S545, the speed ratio G(n) of the gear train corresponding to the current speed n and the gear ratio G(n*) of the gear train corresponding to the target speed n* in accordance with the value of the target speed n* (Step S575 or S595). During the power transfer process (while repeatedly executing the routine), the engine 22, the motors MG1 and MG2 are controlled so that the engine 22 outputs torque equivalent to the target torque Te* and output torques of the motors MG1 and MG2 gradually changes from the start point torques Tm1a, Tm2a that are set and held at Step S545 executed only once just after the start of the routine to the end point torques Tm1b, Tm2b that are set and held at Step S575 or S595 executed only once just after the start of the routine (Step S600-620). According to the simultaneous engagement state drive control routine of FIG. 18, it may be slightly difficult to handle the change of the torque demand Tr*. However, the torque can be transferred between the motors MG1 and MG2 while reducing shock due to the change of torque output to the drive shaft 67 while lightening the computation load in the power transfer process and reducing shock due to the change of torque output to the drive shaft 67.

Figure 19:
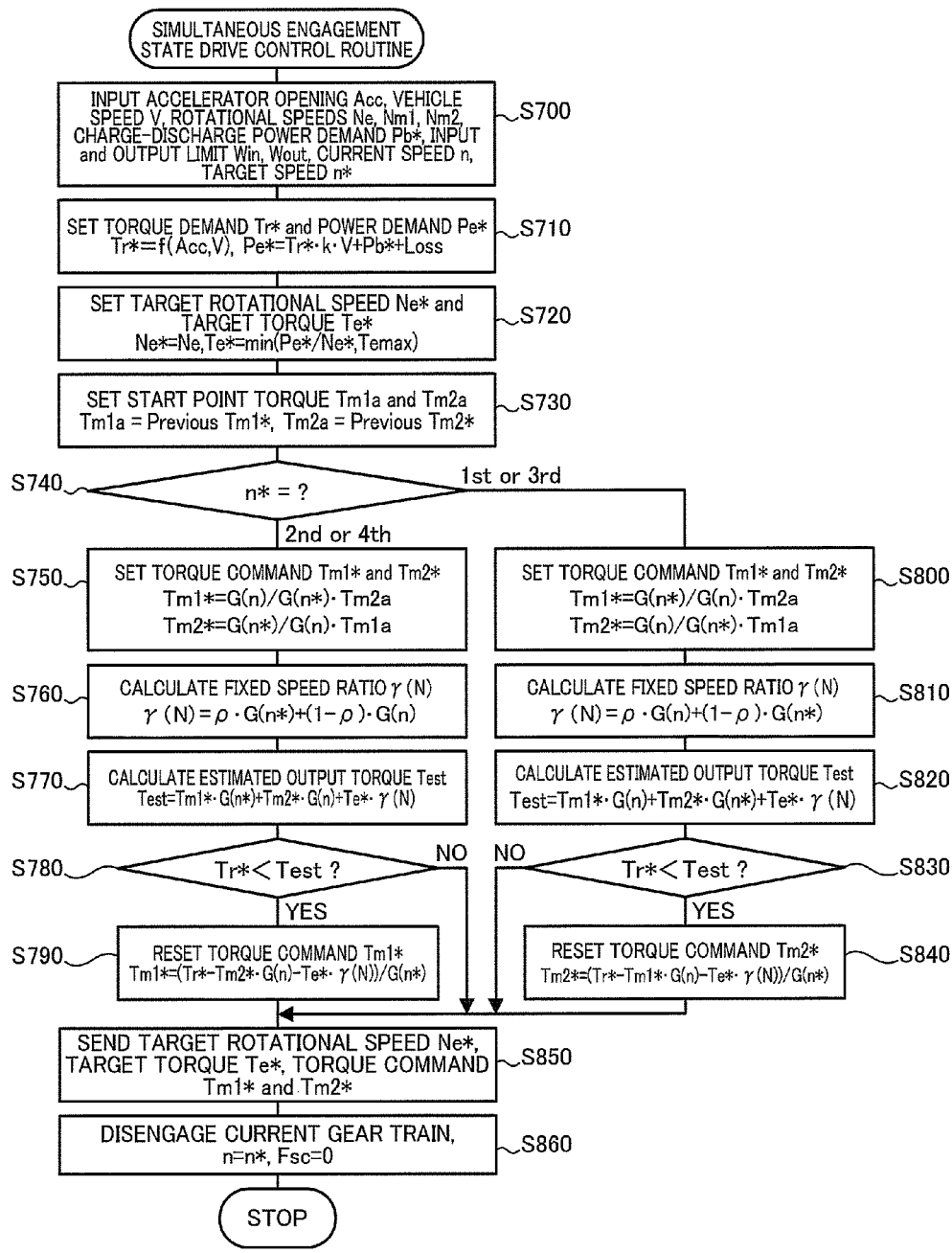
FIG. 19 is a flowchart illustrating another example of the simultaneous engagement state drive control routine executed by the hybrid ECU 70.

FIG. 19 is a flowchart illustrating another example of the simultaneous engagement state drive control routine executed in, the above hybrid vehicle 20. This routine is also executed by the hybrid ECU 70 when the gear train corresponding to the target speed n* connects the first motor shaft 46 or the carrier shaft 45a with the drive shaft 67 at Step S350 while the gear train corresponding to the current speed n connects the carrier shaft 45a or the first motor shaft 46 with the drive shaft 67. When executing the simultaneous engagement state drive control routine of FIG. 19, the CPU 72 of the hybrid ECU 70 executes an input process of data required for control (S700), a setting of the torque demand Tr* and the power demand Pe* (Step S710), and a setting of the target rotational speed Ne* and the target torque Te* of the engine 22 as in the case of Steps S500-S520 of FIG. 16. Then, the CPU 72 sets the start point torques Tm1a and Tm2a of the motors MG1 and MG2 as in the case of Step S545 of FIG. 17 (Step S730) and determines whether the target speed n* input at Step S700 is value "1", "2", "3" or "4" (Step S740). When the target speed n* is value "2" or "4", the CPU 72 sets the torque commands Tm1* and Tm2* of the motors MG1 and MG2 based on the start point torques Tm1a, Tm2a set at Step S730, the gear ratio G(n) of the gear train corresponding to the current speed n, and the gear ratio G(n*) of the gear train corresponding to the target speed n* in accordance with Equation (17) and (18) given below (Step S750). Further, the CPU 72 calculates the $n^{th}$ fixed speed ratio γ(N) based on the gear ratio ρ of the power distribution integration mechanism 40, the gear ratio G(n) of the gear train corresponding to the current speed n, and a gear ratio G(n*) of the gear train corresponding to the target speed n* (Step S760). Then, the CPU 72 calculates an estimated output torque Test that is estimation of torque output to the drive shaft 67 based on the set torque commands Tm1* and Tm2*, gear ratios G(n) and G(n*) at Step 770, and the calculated $n^{th}$ fixed speed ratio γ(N), and determines whether or not the torque demand Tr* set at Step S710 is less than the estimated output torque Test (Step S780). When the torque demand Tr* is less than the estimated output torque Test, the CPU 72 resets the torque command Tm1* of the motor MG1 in accordance with Equation (19) given below so that excessive torque is not output to the drive shaft 67 (Step S790). When the torque demand Tr* is equal to or more than the estimated output torque Test, a process of Step S790 is skipped. When the target speed n* is value "1" or "3", the CPU 72 sets the torque commands Tm1* and Tm2* of the motors MG1 and MG2 based on the start point torques Tm1a, Tm2a set at Step S730, the gear ratio G(n) of the gear train corresponding to the current speed n, and the gear ratio G(n*) of the gear train corresponding to the target speed n* in accordance with. Equation (20) and (21) given below (Step S800). Further, the CPU 72 calculates the $n^{th}$ fixed speed ratio γ(N) based on the gear ratio ρ of the power distribution integration mechanism 40, the gear ratio G(n) of the gear train corresponding to the current speed n, and a gear ratio G(n*) of the gear train corresponding to the target speed n* (Step S810). Then, the CPU 72 calculates an estimated output torque Test that is estimation of torque output to the drive shaft 67 based on the set torque commands Tm1* and Tm2*, gear ratios G(n) and G(n), and the calculated $n^{th}$ fixed speed ratio γ(N) as Step S820, and determines whether or not the torque demand Tr* set at Step S710 is less than the estimated output torque Test (Step S830). When the torque demand Tr* is less than the estimated output torque Test, the CPU 72 resets the torque command Tm1* of the motor MG1 in accordance with Equation (22) given below so that excessive torque is not output to the drive shaft 67 (Step S840). When the torque demand Tr* is equal to or more than the estimated output torque Test, a process of Step S840 is skipped. After setting the target rotational speed Ne* and the target torque Te* of the engine 22 and the torque commands Tm1* and Tm2* of the motors MG1 and MG2, the CPU 72 sends the target rotational speed Ne* and the target torque Te* of the engine 22 to the engine ECU 24 and sends the torque commands Tm1* and Tm2* of the motors MG1 and MG2 to the motor ECU 30 (Step S850). After a data sending process of Step S850, the CPU 72 sends a command signal to the actuator 91 or 92 of the clutch C1 or C2 so as to disconnect the carrier shaft 45a or the first motor shaft 46 from the gear train corresponding to the current speed n, sets the current speed n to the target speed n*, and sets the shift change flag Fsc to value "0" (Step S860). Then, the CPU 72 terminates the routine. As described above, the start point torques Tm1a and Tm2a of the motors MG1 and MG2 may be set to the motor torque demands (the previous values of the torque commands Tm1* and Tm2*) of the motors MG1 and MG2 based on the torque demand Tr* set just before the transmission 60 implements the $N^{th}$ simultaneous engagement state and the target torque Te* of the engine 22. Further, the torque commands (end point torques) Tm1* and Tm2* of the motors MG1 and MG2 may be set based on the set start points torques Tm1a and Tm2a and speed ratios of the transmission 60 (the gear ratio G(n) of the gear train corresponding to the current speed n and the gear ratio G(n*)). Then, the engine 22, the motors MG1 and MG2 are controlled so that the engine 22 outputs torque equivalent to the target torque Te* and the motors MG1 and MG2 respectively output torque equivalent to corresponding one of the torque commands (end point torques) Tm1* and Tm2*. This may cause shock due to the change of output torques of the motors MG1 and MG2 to some extent. However, it is possible to responsively switch between the connection between the carrier 45 of the power distribution integration mechanism 40 and the drive shaft 67 and the connection between the sun gear 41 and the drive shaft 67 while lightening the computation load.

$$Tm1^* = G(n)/G(n^*) \cdot Tm2a \tag{17}$$

$$Tm2^* = G(n^*)/G(n) \cdot Tm1a \tag{18}$$

$$Tm1^* = (Tr^* - Tm2^* \cdot G(n) - Te \cdot \gamma(N))G(n^*) \tag{19}$$

$$Tm1^* = G(n^*)/G(n) \cdot Tm2a \tag{20}$$

$$Tm2^* = G(n)/G(n^*) \cdot Tm1a \tag{21}$$

$$Tm2^* = Tr^* - Tm1^* \cdot G(n) - Te^* \cdot \gamma(N)/G(n^*) \tag{22}$$

Figure 20:
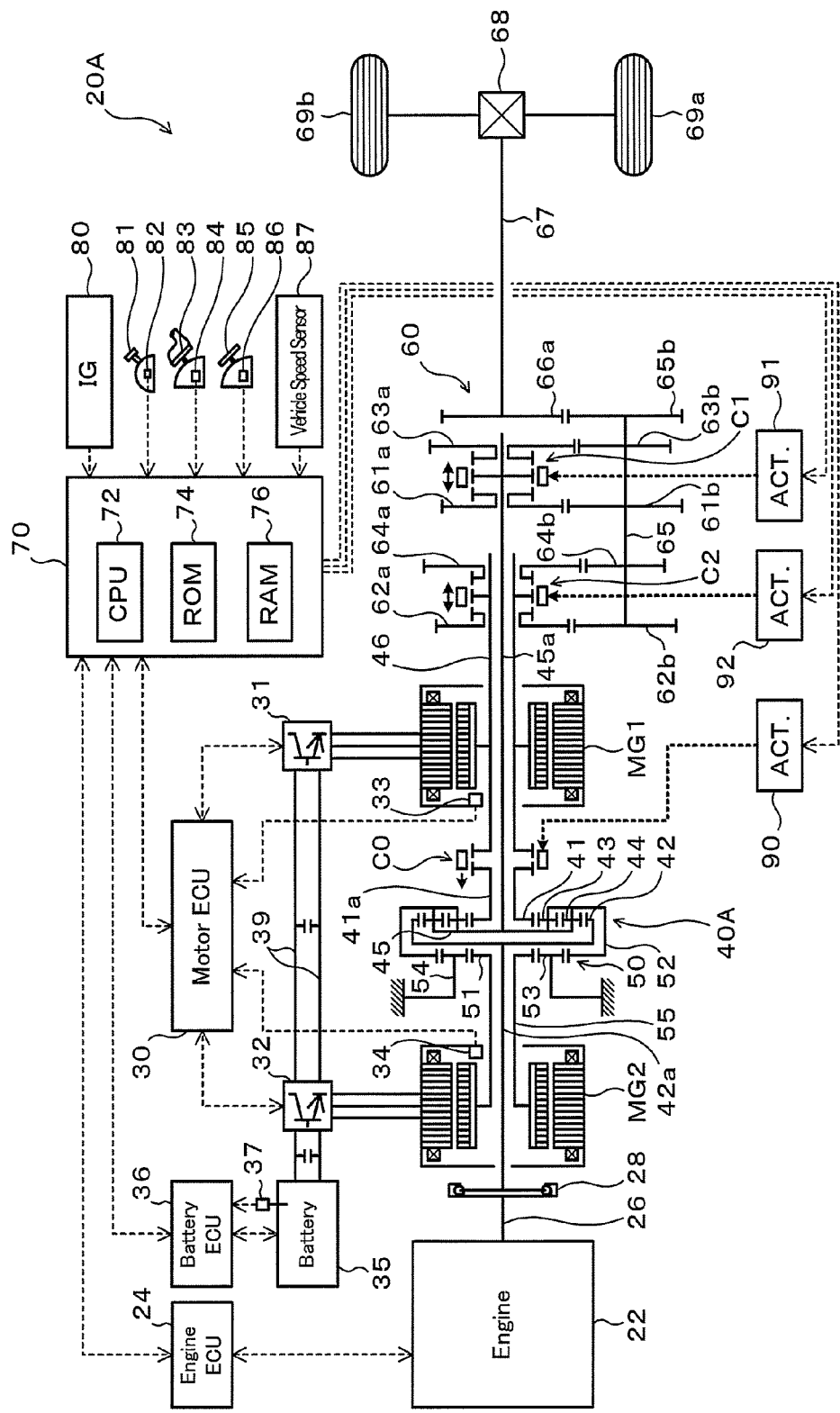
FIG. 20 is a schematic block diagram of an hybrid vehicle 20A according to a modified example.

The above hybrid vehicle 20 includes the power distribution integration mechanism 40 configured to have the gear ratio ρ satisfying an equation of ρ=0.5. However, the present invention is not limited to this. That is, the power distribution integration mechanism may be configured to have a gear ratio ρ that is not value "0.5". FIG. 20 is a schematic block diagram of an hybrid vehicle 20A including a power distribution integration mechanism 40A or a double pinion planetary gear mechanism configured to have the gear ratio ρ that is less than value "0.5". The hybrid vehicle 20 includes a reduction gear mechanism 50 disposed between the power distribution integration mechanism 40A and the engine 22. The reduction gear mechanism 50 is a single pinion planetary gear mechanism and includes a sun gear 51 that is an external gear connected with the rotor of the motor MG2 via a second motor shaft 55, a ring gear 52 that is an internal gear arranged concentrically with the sun gear 51 and secured to the carrier 45 of the power distribution integration mechanism 40A, multiple pinion gears 53 arranged to engage with the sun gear 51 and with the ring gear 52, and a carrier 54 arranged to support the multiple pinion gears 53 so as to allow both their revolutions and their rotations on their axes and secured to the transmission case. The function of the reduction gear mechanism 50 reduces the speed of power from the motor MG2 to be input into the carrier 45 of the power distribution integration mechanism 40A, while increasing the speed of the output power from the carrier 45 to be input into the motor MG2. In the power distribution integration mechanism 40A or the double pinion planetary gear mechanism having the gear ratio ρ of less than 0.5, the engine 22 has a large torque distribution rate to the carrier 45 in comparison with the sun gear 41. The arrangement of the reduction gear mechanism 50 between the carrier 45 of the power distribution integration mechanism 40 and the motor MG2 downsizes the motor MG2 and reduces a power loss of the motor MG2. The arrangement of the reduction gear mechanism 50 between the motor MG2 and the power distribution integration mechanism 40 to be integrated with the power distribution integration mechanism 40 enables further size reduction of the power output apparatus. In the embodiment, the reduction gear mechanism 50 is constructed to have a reduction gear ratio (number of teeth of the sun gear 51/number of teeth of the ring gear 52) set to a value close to ρ/(1−ρ), where ρ represents the gear ratio of the power distribution integration mechanism 40. The motors MG1 and MG2 can thus be constructed to have substantially identical specifications. This arrangement effectively improves the productivity of the hybrid vehicle 20 and the power output apparatus and reduces the manufacturing cost of the hybrid vehicle 20 and the power output apparatus.

The above hybrid vehicle 20 and 20A may include, instead of the power distribution integration mechanism 40 or 40A, a power distribution integration mechanism constructed as a planetary gear mechanism including a first sun gear, a second sun gear having, a different number of teeth from that of the first sun gear and a carrier holding at least one stepped gear configured to unite a first pinion gear engaging with the first sun gear and a second pinion gear engaging with the second sun gear. Further, in the hybrid vehicle 20 and 20A, the clutch C0 is not limited to the structure disposed between the sun gear 41 or the second element of the power distribution integration mechanism 40, 40A and the motor MG1 or the second motor and connecting and disconnecting the sun gear 41 with and from the motor MG1. The clutch C0 may be disposed between the carrier 45 or the first element of the power distribution integration mechanism 40, 40A and the motor MG2 or the first motor and configured to connect and disconnect the carrier 45 with and from the motor MG2. The clutch C0 may be disposed between the ring gear 42 or third element of the power distribution integration mechanism 40, 40A and the crankshaft 26 of the engine 22 and configured to connect and disconnect the ring gear 42 and the crankshaft 26.

The transmission 60 in the embodiment is a parallel-shaft type transmission including a first transmission mechanism having a first gear train and a third gear train that are parallel-shaft type gear trains capable of connecting the carrier 45 or the first element of the power distribution integration mechanism 40 with the drive shaft 67 and a second transmission mechanism having a second gear train and a fourth gear train that are parallel-shaft type gear trains capable of connecting the first motor shaft 46 of the motor MG1 with the drive shaft 67. However, in the hybrid vehicle 20 of the embodiment, a planetary gear type transmission may be employed instead of the parallel-shaft type transmission 60.

Figure 21:
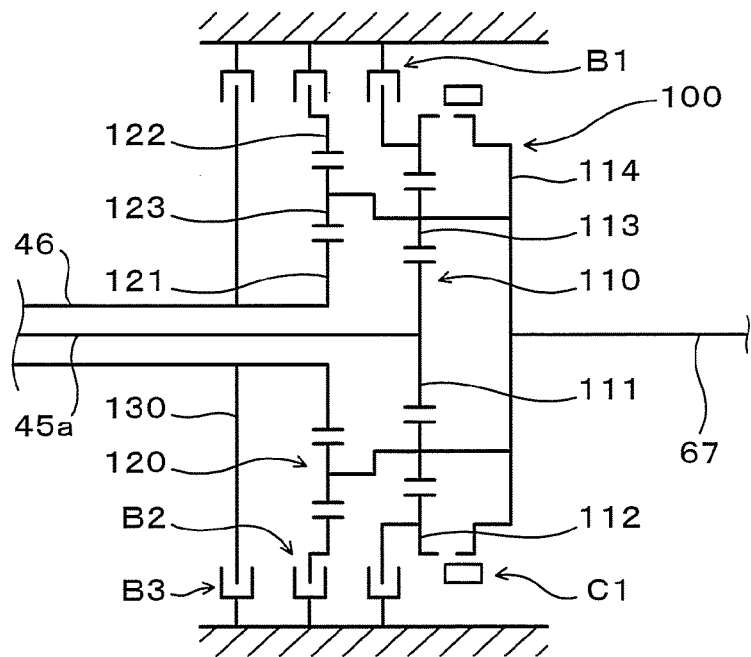

FIG. 21 is a schematic block diagram of a planetary gear type transmission 100 applicable to the above hybrid vehicle 20 and 20A. The transmission 100 shown in FIG. 21 is also capable of setting a change speed state (speed ratio) to a plurality of stages and includes a first change speed planetary gear mechanism 110 capable of connecting the carrier 45 (carrier shaft 45a) or the first element of the power distribution integration mechanism 40 with the drive shaft 67, a second change speed planetary gear mechanism 120 capable of connecting the first motor shaft 46 of the motor MG1 (sun gear 41) with the drive shaft 67, a brake B1 (first fixing mechanism) provided for the first change speed planetary gear mechanism 110, a brake B2 (second fixing mechanism) provided for the second change speed planetary gear mechanism 120, a brake B3 (third fixing mechanism), a clutch C1 (change speed connecting-disconnecting mechanism) and the like. The first change speed planetary gear mechanism 110 and the brake B1 constitute the first transmission mechanism of the transmission 100, and the second change speed planetary gear mechanism 120 and the brake B2 constitute the second transmission mechanism of the transmission 100. As shown in FIG. 21, the first change speed planetary gear mechanism 110 is a single pinion planetary gear mechanism having a sun gear 111 (input element) connected with the carrier shaft 45a, a ring gear 112 (fixable element) that is an internal gear arranged concentrically with the sun gear 111, and a carrier 114 (output element) connected to the drive shaft 67 and holding a plurality of pinion gears 113 respectively engaging with both the sun gear 111 and the ring gear 11, and the sun gear 111 (input element), the ring gear 112 (fixable element). The second change speed planetary gear mechanism 120 is a single-pinion type planetary gear mechanism having a sun gear 121 (input element) connected with the first motor shaft 46, a ring gear 122 (fixable element) that is an internal gear arranged concentrically with the sun gear 121, and the carrier 114 (output element) holding a plurality of pinion gears 123 respectively engaging with both the sun gear 121 and the ring gear 122 and common to the first change speed planetary gear mechanism 110, and the sun gear 121 (input element), the ring gear 122 (fixable element). In the example in FIG. 20, the second change speed planetary gear mechanism 120 is coaxially arranged with the first change speed planetary gear mechanism 110 in a vehicle front side of the first change speed planetary gear mechanism 110. A gear ratio ρ2 (the number of teeth of the sun gear 121/the number of teeth of the ring gear 122) of the second change speed planetary gear mechanism 120 is set slightly larger than a gear ratio ρ1 (the number of teeth of the sun gear 111/the number of teeth of the ring gear 112) of the first change speed planetary gear mechanism 110. The brake B1 is capable of fixing the ring gear 112 of the first change speed planetary gear mechanism 110 to the transmission case in a non-rotatable manner and releasing the ring gear 112 in a rotatable manner. The brake B2 is capable of fixing the ring gear 122 of the second change speed planetary gear mechanism 120 to the transmission case in the non-rotatable manner and releasing the ring gear 122 in the rotatable manner. The brake B3 is capable of fixing the first motor shaft 46, that is, the sun gear 41 or the second element of the power distribution integration mechanism 40 to the transmission case in the rotatable manner via a fixing element 130 secured to the first motor shaft 46 and making the first motor shaft 46 rotatable by releasing the fixing element 130. The clutch C1 is capable of performing a connection between the carrier 114 or the output element of the first change speed planetary gear mechanism 110 and the ring gear 112 or the fixable element and a release of the connection. The brakes B1, B2, B3 and the clutch C1 are respectively driven by an electromagnetic, electric or hydraulic actuator not shown in the figure. The transmission 100 constituted as above can reduce the size in the axial direction and the radial direction in comparison with the parallel-shaft type transmission, for example. Since the first change speed planetary gear mechanism 110 and the second change speed planetary gear mechanism 120 can be arranged on the downstream side of the engine 22, the motors MG1, MG2 and the power distribution integration mechanism 40 coaxially therewith, bearings can be simplified and the number of bearings can be reduced by adopting the transmission 100.

In the transmission 100, the speed ratio can be set in a plurality of stages as described below. That is, the power from the carrier shaft 45a can be speed-changed and transmitted to the drive shaft 67 at a speed ratio ($\rho 1/(1+\rho 1)$) based on the gear ratio ρl of the first change speed planetary gear mechanism 110 (hereafter this state is referred to as the "first change speed state (first speed)") by fixing the ring gear 112 of the first change speed planetary gear mechanism 110 to the transmission case in the non-rotatable manner by the brake B1. The power from the first motor shaft 46 can be speed-changed and transmitted to the drive shaft 67 at a speed ratio ($\rho 2/(1+\rho 2)$) based on the gear ratio ρ2 of the second change speed planetary gear mechanism 120 (hereafter this state is referred to as the "second change speed state (second speed)") by fixing the ring gear 122 of the second change speed planetary gear mechanism 120 to the transmission case in the non-rotatable manner by the brake B2. By connecting the carrier 114 of the first change speed planetary gear mechanism 110 with the ring gear 112 by the clutch C1, the sun gear 111, the ring gear 112, and the carrier 114 constituting the first change speed planetary gear mechanism 110 are substantially locked and integrally rotated, so that the power from the carrier shaft 45a can be transmitted to the drive shaft 67 at the speed ratio 1 (hereafter this state is referred to as the "third change speed state (third speed)"). In addition, by fixing the ring gear 122 by the brake B2 constituting the second transmission mechanism in the first change speed state, both the first motor shaft 46 and the carrier 45 can be connected with the drive shaft 67 (this state is called as the "$1^{st}$ speed-$2^{nd}$ speed simultaneous engagement state" or the "first simultaneous engagement state"), so that the power from the engine 22 or the power from at least either one of the motors MG1 and MG2 can be mechanically (directly) transmitted to the drive shaft 67 at a fixed speed ratio (first fixed speed ratio). Also, by connecting the carrier 114 or the output element of the first change speed planetary gear mechanism 110 corresponding to the clutch C1 with the ring gear 112 by the clutch C1 in the second change speed state, both the first motor shaft 46 and the carrier 45 can be connected with the drive shaft 67 (this state is called as the "$2^{nd}$ speed-$3^{rd}$ speed simultaneous engagement state" or the "second simultaneous engagement state"), so that the power from the engine 22 or the power from at least either one of the motors MG1 and MG2 can be mechanically (directly) transmitted to the drive shaft 67 at a fixed speed ratio (second fixed speed ratio) different from the $1^{st}$ speed-$2^{nd}$ speed simultaneous engagement state. Further, by non-rotatably fixing the first motor shaft 46, that is, the sun gear 41 or the second element of the power distribution integration mechanism 40 to the transmission case via the fixing element 130 secured to the first motor shaft 46 by the brake B3 in the third change speed state, the power from the engine 22 or the power from the motor MG2 can be mechanically (directly) transmitted to the drive shaft 67 at a fixed speed ratio less than value "1" ($1/1-\rho$) different from the $1^{st}$ speed-$2^{nd}$ speed simultaneous engagement state and $2^{nd}$ speed-$3^{rd}$ speed simultaneous engagement state (this state is included in the simultaneous engagement state and is called as the "3rd speed over drive state"). As mentioned above, by employing the planetary gear type transmission 100, the same working effect can be obtained as in the case of adopting the parallel-shaft type transmission 60.

Figure 22:
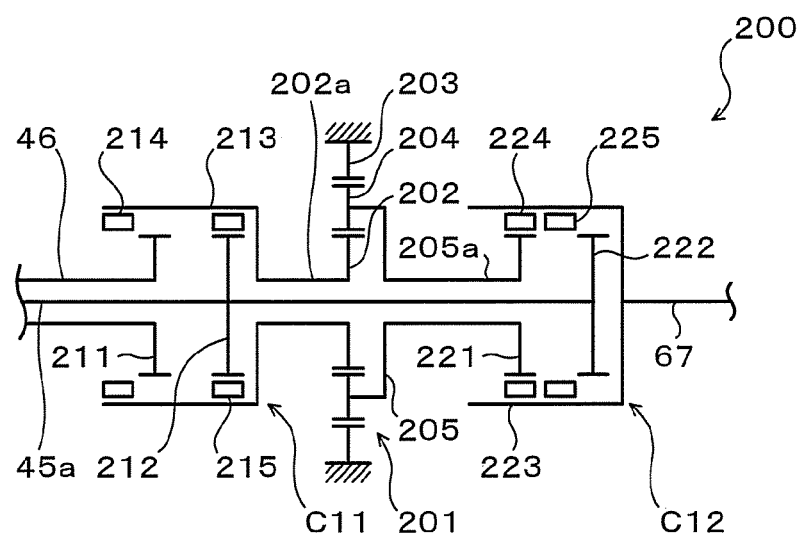

FIG. 22 is a schematic block diagram of still another transmission 200 applicable to the hybrid vehicle 20 and 20A. The transmission 200 shown in FIG. 22 is also capable of setting a change speed state (speed ratio) to a plurality of stages and includes a change speed differential rotation mechanism (reduction device) 201, clutches C11 and C12. The change speed differential rotation mechanism 201 is a single pinion planetary gear mechanism having a sun gear 202 or the input element, a ring gear 203 that is a fixed element fixed to the transmission case in the non-rotatable manner and arranged concentrically with the sun gear 202, and a carrier 205 that is an output element holding a plurality of pinion gears 204 respectively engaging with both the sun gear 202 and the ring gear 203. The clutch C11 includes a first engagement portion 211 provided in a tip of the first motor shaft 46, a second engagement portion 212 provided in the carrier shaft 45a, a third engagement portion 213 provided in a hollow sun gear shaft 202a connected with the sun gear 202 of the change speed differential rotation mechanism 201, a first movable engagement member 214 capable of engaging with both the first and third engagement portion 211 and 213 and arranged movably in an axial direction of the first motor shaft 46, the carrier shaft 45a and the like, and a second movable engagement member 215 capable of engaging with both the second and third engagement portion 212 and 213 and arranged movably in the axial direction. The first and second movable engagement member 214 and 215 are respectively driven by an electromagnetic, electric or hydraulic actuator. By appropriately driving first and second movable engagement member 214 and 215, either one or both of the first motor shaft 46 and the carrier shaft 45a can be selectively connected with the sun gear 202 of the change speed differential rotation mechanism 201. The clutch C12 includes a first engagement portion 221 provided in a tip of a hollow carrier shaft 205a connected with the carrier 250 or the output element of the change speed differential rotation mechanism 201 to extend toward the rear of the vehicle, a second engagement portion 222 provided in the carrier shaft 45a extending through the sun gear shaft 202a and the carrier shaft 205a, a third engagement portion 223 provided in the drive shaft 67, a first movable engagement member 224 capable of engaging with both the first and third engagement portion 221 and 223 and arranged movably in an axial direction of the first motor shaft 46, the carrier shaft 45a and the like, and a second movable engagement member 225 capable of engaging with both the second and third engagement portion 222 and 223 and arranged movably in the axial direction. The first and second movable engagement member 224 and 225 are respectively driven by an electromagnetic, electric or hydraulic actuator. By appropriately driving first and second movable engagement member 224 and 225, either one or both of the carrier shaft 205a and the carrier shaft 45a can be selectively connected with the drive shaft 67.

In the transmission 200, the speed ratio can be set in a plurality of stages as described below. That is, the power from the carrier shaft 45a can be speed-changed and transmitted to the drive shaft 67 at a speed ratio based on a gear ratio the change speed differential rotation mechanism 201 (hereafter this state is referred to as the "first change speed state (first speed)") by connecting the carrier 45a with the sun gear 202 of the change speed differential rotation mechanism 201 by the clutch C11 and the connecting carrier shaft 205a with the drive shaft 67 by the clutch C12. The power from the first motor shaft 46 can be speed-changed and transmitted to the drive shaft 67 at a speed ratio based on the gear ratio of the change speed differential rotation mechanism 201 (hereafter this state is referred to as the "second change speed state (second speed)") by connecting the first motor shaft 46 with the sun gear 202 of the change speed differential rotation mechanism 201 by the clutch C11 and the connecting carrier shaft 205a with the drive shaft 67 by the clutch C12. By connecting the carrier shaft 45a with the drive shaft 67 by the clutch C12 while disengaging the clutch 11 so as not connecting both the carrier shaft 45a and the first motor shaft 46 with the sun gear shaft 202a, the power from the carrier shaft 45a can be transmitted to the drive shaft 67 at the speed ratio 1 (hereafter this state is referred to as the "third change speed state (third speed)"). In addition, by connecting the both the carrier shaft 45a and the first motor shaft 46 with the sun gear 202 by the clutch C11 and connecting the carrier shaft 205a with the drive shaft 67 by the clutch C12 (this state is called as the "1st speed-2nd speed simultaneous engagement state" or the "first simultaneous engagement state"), the power from the engine 22 or the power from at least either one of the motors MG1 and MG2 can be mechanically (directly) transmitted to the drive shaft 67 at a fixed speed ratio (first fixed speed ratio). Also, by connecting both the carrier shaft 45a and the first motor shaft 46 with the sun gear 202 by the clutch C11 and connecting the carrier 45a with the drive shaft 67 (this state is called as the "2nd speed-3rd speed simultaneous engagement state" or the "second simultaneous engagement state"), the power from the engine 22 or the power from at least either one of the motors MG1 and MG2 can be mechanically (directly) transmitted to the drive shaft 67 at a fixed speed ratio (second fixed speed ratio) different from the 1st speed-2nd speed simultaneous engagement state. Further, by non-rotatably fixing the first motor shaft 46, that is, the sun gear 41 or the second element of the power distribution integration mechanism 40 to the transmission case by a brake (not shown) in the third change speed state, the power from the engine 22 or the power from the motor MG2 can be mechanically (directly) transmitted to the drive shaft 67 at a fixed speed ratio different from the 1st speed-2nd speed simultaneous engagement state and 2nd speed-3rd speed simultaneous engagement state (this state is included in the simultaneous engagement state and is called as the "3rd speed fixed state"). As mentioned above, by employing the planetary gear type transmission 200, the same working effect can be obtained as in the case of adopting the parallel-shaft type transmission 60.

Figure 23:
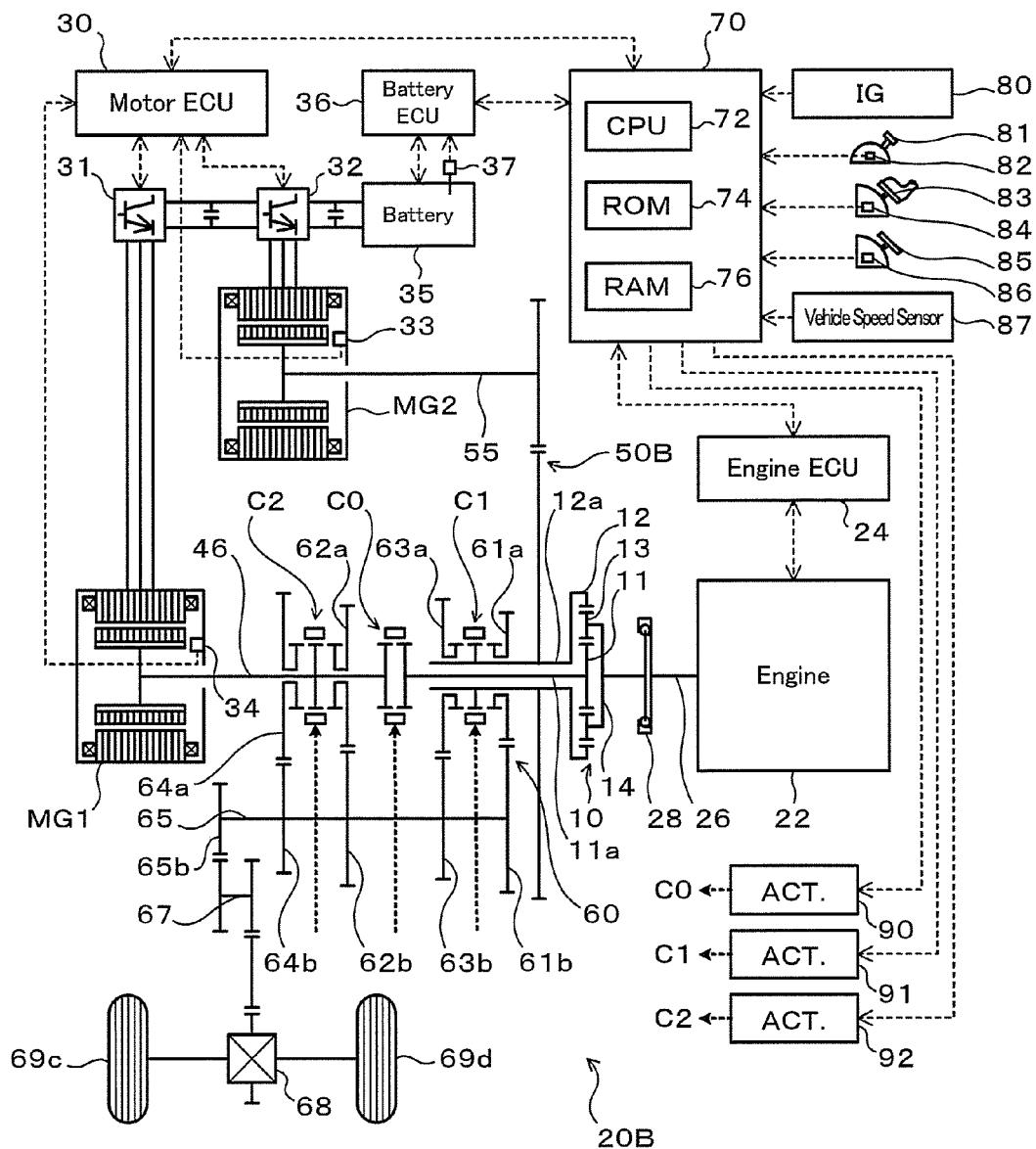
FIG. 23 is a schematic block diagram of an hybrid vehicle 20B according to a modified example.

FIG. 23 is a schematic block diagram of an hybrid vehicle 20B according to a modified example. Though the above-mentioned hybrid vehicle 20 is constituted as a rear-drive vehicle, the hybrid vehicle 20B of the modified example is constituted as a front drive vehicle. The hybrid vehicle 20B is provided with, as shown in FIG. 23, a power distribution integration mechanism 10, that is a single-pinion type planetary gear mechanism including a sun gear 11, a ring gear 12 arranged concentrically with the sun gear 11, and a carrier 14 holding a plurality of pinion gears 13 respectively engaging with both the sun gear 11 and the ring gear 12. In this case, the engine 22 is arranged laterally, and the crankshaft 26 of the engine 22 is connected to the carrier 14 or a third element of the power distribution integration mechanism 10. Also, a hollow ring gear shaft 12a is connected to the ring gear 12 or a first element of the power distribution integration mechanism 10, and the motor MG2 is connected to the ring gear shaft 12a through a reduction gear mechanism 50A that is a parallel-shaft type gear train and the second motor shaft 55 extending in parallel with the first motor shaft 46. To the ring gear shaft 12a, either one of the first gear train (gear 61a) and the third gear train (gear 63a) constituting the first transmission mechanism of the transmission 60 can be selectively fixed. Moreover, a sun gear shaft 11a is connected to the sun gear 11 or a second element of the power distribution integration mechanism 10, and the sun gear shaft 11a is connected to the clutch C0 through the hollow ring gear shaft 12a and can be connected to the first motor shaft 46 or the motor MG1 through the clutch C0. To the first motor shaft 46, either one of the second gear train (gear 62*a*) and the fourth gear train (gear 64*a*) constituting the second transmission mechanism of the transmission 60 can be selectively fixed to the transmission 60. As mentioned above, the hybrid vehicle of the present invention may be constituted as a front drive vehicle.

The simultaneous engagement state drive control routines shown in FIGS. 16-19 may be selected in accordance with states of the vehicle and the like. the hybrid vehicles 20, 20A and 20B may be constituted as a four-wheel drive vehicle either of a rear-drive base or a front-drive base. In the above embodiment, the power output apparatus has been described to be mounted on the hybrid vehicles 20, 20A or 20B but the power output apparatus according to the present invention may be mounted on a moving body such as vehicles other than automobiles, boats, and aircrafts or may be incorporated in a fixed facility such as a construction facility.

The correlation between principal elements of the embodiments and modification examples, and the principal elements of the invention described in the "Disclosure of the Invention" section will now be described. That is, in the above described embodiment and modification examples, the engine 22 corresponds to "internal combustion engine", the motor MG2 configured to input and output power corresponds to "first motor", the motor MG1 configured to input and output power corresponds to "second motor", the battery 35 configured to supply and receive electric power from each of the motors MG1 and MG2 corresponds to "accumulator", the power distribution integration mechanisms 40, 40A and 10 correspond to "power distribution integration mechanism", the transmissions 60, 100 and 200 correspond to "change speed transmission", the hybrid ECU 70 executing the process at Step S110 of FIG. 12, Step S510 of FIG. 16-18, or Step S710 of FIG. 19 corresponds to "power demand setting module", and a combination of the hybrid ECU 70 executing the drive control routine of FIGS. 12 and 13 and the simultaneous engagement state drive control routines shown in any one of FIGS. 16-19, the engine ECU 24 controlling the engine 22 in accordance with commands from the hybrid ECU 70 and the motor ECU 30 controlling the motors MG1 and MG2 in accordance with commands from the hybrid ECU 70 correspond to "control module".

The "internal combustion engine" is not limited to the engine 22 that consumes the hydrocarbon fuel, such as gasoline or light oil and outputs power, but may be an internal combustion engine of any other design, for example, a hydrogen engine. The "first motor" and "second motor" are not limited to the motor MG2 and the motor MG1 constructed as the synchronous motor generator but may have any other configuration or design, for example, an induction motor. The "accumulator" is not limited to the secondary cell such as the battery 35 but may be implemented by any configuration of supplying and receiving electric power from each of the first and second motors such a capacitor. The "power distribution integration mechanism" may be implemented by any configuration of having the first element connected to the rotating shaft of the first motor, the second element connected to the rotating shaft of the second motor, and the third element connected to the engine shaft of the internal combustion engine and configured to input or output power based on power input to or output from either two of the three elements to the residual element. The "change speed transmission" may be any configuration of selectively connecting either one or both of the first and second elements of the power distribution integration mechanism with the drive shaft and transmitting power from the first element and power from the second element at respective speed ratios to the drive shaft. The "power demand setting module" is not limited to the module setting the torque demand Tr* based on the accelerator opening Acc and the vehicle speed V but may be implemented by any configuration of setting the power demand required based on the driving force demand operation of the driver such as a module setting the torque demand based on only the accelerator opening Acc. The "control module" may be implemented by any configuration of controlling the internal combustion engine, the first and second motors and the change speed transmission so as to ensure power equivalent to the set power demand while performing the rotational speed adjustment process, the connection the other of the first and second elements with the drive shaft by the change speed transmission, the power transfer process, and the disconnection the one of the first and second elements from the drive shaft, in response to the satisfaction of the predetermined change speed state shift condition while the change speed transmission connects the one of the first and second elements with the drive shaft, the internal combustion engine is operated and the first and second motors are driven and controlled. In any case, the correspondence between the main elements in the embodiment and the variant and the main elements in the invention described in "Disclosure of the Invention" do not limit the elements in the invention described in "Disclosure of the Invention" since the embodiment is an example for describing in detail the best mode for carrying out the invention described in "Disclosure of the Invention". Specifically, the embodiment is merely a detailed example of the invention described in "Disclosure of the Invention", and the invention described in "Disclosure of the Invention" should be construed on the basis of the description therein.

Hereinbefore, the embodiments of the present invention have been described with reference to drawings, however, the present invention is not limited to the above embodiments. It will be apparent that various modifications can be made to the present invention without departing from the spirit and scope of the present invention.

The invention claimed is:

1. A power output apparatus that outputs power to a drive shaft, the power output apparatus comprising:
    an internal combustion engine;
    a first motor configured to input and output power;
    a second motor configured to input and output power;
    an accumulator configured to supply and receive electric power from each of the first and second motors;
    a power distribution integration mechanism having a first element connected to a rotating shaft of the first motor, a second element connected to a rotating shaft of the second motor, and a third element connected to an engine shaft of the internal combustion engine, the power distribution integration mechanism configured to input or output power based on power input to or output from either two of the three elements to a residual element;
    a change speed transmission configured to selectively connect either one or both of the first and second elements of the power distribution integration mechanism with the drive shaft and to transmit power from the first element and power from the second element at respective speed ratios to the drive shaft;
    a power demand setting module configured to set a power demand required for the drive shaft; and
    a control module that controls the internal combustion engine, the first and second motors and the change speed transmission so as to ensure power equivalent to the set power demand; the control module disconnecting one of the first and second elements of the power distribution integration mechanism from the drive shaft and connecting the other of the first and second elements with the drive shaft while performing a rotational speed adjustment process, a connection the other of the first and second elements with the drive shaft by the change speed transmission, a power transfer process, and a disconnection the one of the first and second elements from the drive shaft, in response to a satisfaction of a predetermined change speed state shift condition while the change speed transmission connects the one of the first and second elements with the drive shaft, the internal combustion engine is operated and the first and second motors are driven and controlled; the rotational speed adjustment process being a process of adjusting the rotational speed of the first or second motor corresponding to the other of the first and second elements so as to enable the connection between the other of the first and second elements and the drive shaft; the power transfer process being a process of transferring power between the first and second motors while the change speed transmission connects both of the first and second elements with the drive shaft so as to make the first and second motors respectively output power required when only the other of the first and second elements is connected with the drive shaft.

2. A power output apparatus according to claim 1, wherein the power transfer process sets start point torques of the first and second motors to motor torque demands of the first and second motors in a pre-change speed state before the change speed transmission connects both of the first and second elements with the drive shaft, the motor torque demands being obtained based on the power demand upon a predetermined timing and an engine torque demand of the internal combustion engine based on the power demand upon the predetermined timing, wherein the power transfer process sets end point torques of the first and second motors to motor torque demands of the first and second motors in a post-change speed state after the change speed transmission disconnects the one of the first and second elements from the drive shaft, the motor torque demands being obtained based on the power demand upon a predetermined timing and an engine torque demand of the internal combustion engine based on the power demand upon the predetermined timing, and wherein the power transfer process controls the internal combustion engine, the first and second motors so that the internal combustion engine outputs torque equivalent to the engine torque demand and output torques of the first and second motors changes from the start point torques to the end point torques.

3. A power output apparatus according to claim 2, wherein the control module sets the start and end point torques of the first and second motors based on the power demand and the engine torque demand of the internal combustion engine based on the power demand every time the power demand is set during the power transfer process, and wherein the control module controls the internal combustion engine, the first and second motors so that the internal combustion engine outputs torque equivalent to the engine torque demand and output torques of the first and second motors gradually changes from the start point torques to the end point torques.

4. A power output apparatus according to claim 2, wherein the control module sets the start point torques of the first and second motors to the motor torque demands of the first and second motors based on the power demand set just before the change speed transmission connects both of the first and second elements with the drive shaft and the engine torque demand of the internal combustion engine based on the power demand, upon a start of the power transfer process, wherein the control module sets the end point torques of the first and second motors based on the power demand and the engine torque demand of the internal combustion engine based on the power demand every time the power demand is set during the power transfer process, and wherein the control module controls the internal combustion engine, the first and second motors so that the internal combustion engine outputs torque equivalent to the engine torque demand and output torques of the first and second motors gradually changes from the start point torques to the end point torques.

5. A power output apparatus according to claim 2, wherein the control module sets the start point torques of the first and second motors to the motor torque demands of the first and second motors based on the power demand set just before the change speed transmission connects both of the first and second elements with the drive shaft and the engine torque demand of the internal combustion engine based on the power demand, upon a start of the power transfer process, wherein the control module sets the end point torques of the first and second motors based on the set start points torques and speed ratios of the change speed transmission between the first or second element and the drive shaft in the pre-change speed state and the post-change speed state, and wherein the control module controls the internal combustion engine, the first and second motors so that the internal combustion engine outputs torque equivalent to the engine torque demand and output torques of the first and second motors gradually changes from the start point torques to the end point torques every time the power demand is set.

6. A power output apparatus according to claim 2, wherein the control module sets the start point torques of the first and second motors to the motor torque demands of the first and second motors based on the power demand set just before the change speed transmission connects both of the first and second elements with the drive shaft and the engine torque demand of the internal combustion engine based on the power demand, during the power transfer process, wherein the control module sets the end point torques of the first and second motors based on the set start points torques and speed ratios of the change speed transmission between the first or second element and the drive shaft in the pre-change speed state and the post-change speed state, and wherein the control module controls the internal combustion engine, the first and second motors so that the internal combustion engine outputs torque equivalent to the engine torque demand and the first and second motors respectively output torque equivalent to corresponding one of the end point torques.

7. A power output apparatus according to claim 1, wherein the rotational speed adjustment process conforms the rotational speed of the first or second motor corresponding to the other of the first and second elements to a target rotational speed based on a rotational speed of the drive shaft, a speed ratio of the change speed transmission between the first element of the power distribution integration mechanism and the drive shaft, and the speed ratio between the second element and the drive shaft.

8. A power output apparatus according to claim 1, wherein the change speed transmission is a parallel-shaft type transmission including a first transmission mechanism having at least one parallel-shaft type gear trains capable of connecting either one of the first and second elements of the power distribution integration mechanism with the drive shaft, and a second transmission mechanism having at least one parallel-shaft type gear trains capable of connecting the other of the first and second elements of the power distribution integration mechanism with the drive shaft.

9. A power output apparatus according to claim 1, wherein the change speed transmission is a planetary gear type transmission including a first planetary gear mechanism capable of connecting the first element of the power distribution integration mechanism with the drive shaft, and a second planetary gear mechanism capable of connecting the second element of the power distribution integration mechanism with the drive shaft.

10. A power output apparatus according to claim 1, wherein the change speed transmission is a planetary gear type transmission including a planetary gear mechanism capable of connecting either one of the first and second elements of the power distribution integration mechanism with the drive shaft, and a coupling mechanism capable of coupling the other of the first and second elements of the power distribution integration mechanism with the drive shaft.

11. A hybrid vehicle including a drive wheel driven by power from a drive shaft, the power vehicle comprising:
an internal combustion engine;
a first motor configured to input and output power;
a second motor configured to input and output power;
an accumulator configured to supply and receive electric power from each of the first and second motors;
a power distribution integration mechanism having a first element connected to a rotating shaft of the first motor, a second element connected to a rotating shaft of the second motor, and a third element connected to an engine shaft of the internal combustion engine, the power distribution integration mechanism configured to input or output power based on power input to or output from either two of the three elements to a residual element;
a change speed transmission configured to selectively connect either one or both of the first and second elements of the power distribution integration mechanism with the drive shaft and to transmit power from the first element and power from the second element at respective speed ratios to the drive shaft;
a power demand setting module configured to set a power demand required for the drive shaft; and
a control module that controls the internal combustion engine, the first and second motors and the change speed transmission so as to ensure power equivalent to the set power demand; the control module disconnecting one of the first and second elements of the power distribution integration mechanism from the drive shaft and connecting the other of the first and second elements with the drive shaft while performing a rotational speed adjustment process, a connection the other of the first and second elements with the drive shaft by the change speed transmission, a power transfer process, and a disconnection the one of the first and second elements from the drive shaft, in response to a satisfaction of a predetermined change speed state shift condition while the change speed transmission connects the one of the first and second elements with the drive shaft, the internal combustion engine is operated and the first and second motors are driven and controlled; the rotational speed adjustment process being a process of adjusting the rotational speed of the first or second motor corresponding to the other of the first and second elements so as to enable the connection between the other of the first and second elements and the drive shaft; the power transfer process being a process of transferring power between the first and second motors while the change speed transmission connects both of the first and second elements with the drive shaft so as to make the first and second motors respectively output power required when only the other of the first and second elements is connected with the drive shaft.

12. A control method of a power output apparatus including a drive shaft, an internal combustion engine, first and second motors respectively configured to input and output power, an accumulator configured to supply and receive electric power from each of the first and second motors, a power distribution integration mechanism having a first element connected to a rotating shaft of the first motor, a second element connected to a rotating shaft of the second motor, and a third element connected to an engine shaft of the internal combustion engine, the power distribution integration mechanism configured to input or output power based on power input to or output from either two of the three elements to a residual element, and a change speed transmission configured to selectively connect either one or both of the first and second elements of the power distribution integration mechanism with the drive shaft and to transmit power from the first element and power from the second element at respective speed ratios to the drive shaft, the method comprising the steps of:
(a) adjusting the rotational speed of the first or second motor corresponding to the other of the first and second elements so as to enable the connection between the other of the first and second element and the drive shaft in response to a satisfaction of a predetermined change speed state shift condition while the change speed transmission connects the one of the first and second elements with the drive shaft, the internal combustion engine is operated and the first and second motors are driven and controlled;
(b) connecting the other of the first and second elements with the drive shaft by the change speed transmission;
(c) transferring power between the first and second motors while the change speed transmission connects both of the first and second elements with the drive shaft so as to make the first and second motors respectively output power required when only the other of the first and second elements is connected with the drive shaft; and
(d) disconnecting the one of the first and second elements from the drive shaft by the change speed transmission.

* * * * *

UNITED STATES PATENT AND TRADEMARK OFFICE
CERTIFICATE OF CORRECTION

PATENT NO. : 8,251,165 B2
APPLICATION NO. : 12/600811
DATED : August 28, 2012
INVENTOR(S) : Hiroshi Katsuta et al.

It is certified that error appears in the above-identified patent and that said Letters Patent is hereby corrected as shown below:

In the Specification

Column 1, line 24-25, change "there is well-known a conventional" to --there is a well-known conventional--;

Column 1, line 31, change "a output" to --an output--;

Column 1, line 36, change "there is well-known a conventional" to --there is a well-known conventional--;

Column 2, line 38, change "a connection the other" to --a connection between the other--;

Column 2, line 41, change "a disconnection the one" to --a disconnection between the one--;

Column 6, line 31, change "drive, shaft" to --drive shaft--;

Column 10, line 10, change "46'" to --46--;

Column 10, line 22, change "connection" to --a connection--;

Column 10, line 53, change "transmission, capable" to --transmission capable--;

Column 11, line 23, change "the an engagement" to --an engagement--;

Column 11, line 62-63, change "That though" to --That is, though--;

Column 13, line 29, change " $(=(I-p)\cdot G(I)+pG(2))$ " to -- $(=(I-p)\cdot G(I)+p\cdot G(2))$ --;

Column 13, line 50, change "a change, in" to --a change in--;

Column 15, line 12, change "thick arrows on," to --Thick arrows on--;

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 8,251,165 B2

Column 18, line 6, change "speed. Ne" to --speed Ne--;

Column 19, line 11, change "FIG 15 is illustrates" to --FIG. 15 illustrates--;

Column 21, line 51, change "toque" to --torque--;

Column 22, line 54, change "toque" to --torque--;

Column 23, line 46, change "the simultaneous" to --the Nth simultaneous--;

Column 24, line 2, change "toque" to --torque--;

Column 24, line 6, change "(Step S40)" to --(Step S540)--;

Column 24, line 11, change "Step – S500" to --Step S500--;

Column 24, equation (7), change " $Tm1a=-p \cdot Te$ " to -- $Tm1a=-p \cdot Te^*$ --;

Column 24, equation (8), change " $Tm2a=Tr^*/G(n)+(1-p)/p \cdot Tm1a$ " to -- $Tm2a=Tr^*/G(n)+(1-p)/p \cdot Tm1a$ --;

Column 25, line 13, change "G(n)" to --G(n*)--;

Column 25, line 30, change "time is" to --time ts--;

Column 26, line 18, change "sung gear 41" to --sun gear 41--;

Column 27, line 57, change "toque" to --torque--;

Column 28, line 23, change "s570" to --S570--;

Column 28, line 63, change "torque Further" to --torque demand Tr*. Further,--;

Column 29, line 66, change "in, the" to --in the--;

Column 30, line 46, change "with. Equation" to --with Equation--;

Column 30, line 55, change "G(n) and G(n)" to --G(n) and G(n*)--;

Column 31, equation (19), change " $Tm1^*=(Tr^* \cdot Tm2^* \cdot G\{n\} \cdot Te \cdot y(N))/G(n^*)$ " to -- $Tm1^*=(Tr^*-Tm2^* \cdot G\{n\} \cdot Te^* \cdot y\,(N))/G(n^*)$ --;

Column 32, line 31, change "having, a different" to --having a different--;

Column 34, line 9, change "pl" to --pl--;

Column 37, line 11, change "like, the hybrid" to --like. The hybrid--.